(12) United States Patent  
Horita et al.

(10) Patent No.: US 11,633,670 B2  
(45) Date of Patent: Apr. 25, 2023

(54) INFORMATION PROCESSING SYSTEM, NON-TRANSITORY COMPUTER-READABLE STORAGE MEDIUM HAVING STORED THEREIN INFORMATION PROCESSING PROGRAM, INFORMATION PROCESSING APPARATUS, AND INFORMATION PROCESSING METHOD

(71) Applicant: Nintendo Co., Ltd., Kyoto (JP)

(72) Inventors: Junpei Horita, Kyoto (JP); Kazuyoshi Sensui, Kyoto (JP); Masahiro Nitta, Kyoto (JP); Yasuharu Ohta, Kyoto (JP); Junki Uosawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 18 days.

(21) Appl. No.: 17/526,538

(22) Filed: Nov. 15, 2021

(65) Prior Publication Data

US 2022/0152493 A1     May 19, 2022

(30) Foreign Application Priority Data

Nov. 16, 2020 (JP) .............................. JP2020-190521

(51) Int. Cl.
 *A63F 13/525*     (2014.01)
 *A63F 13/213*     (2014.01)

(52) U.S. Cl.
 CPC .......... *A63F 13/525* (2014.09); *A63F 13/213* (2014.09)

(58) Field of Classification Search
 CPC .. A63F 13/525; A63F 13/213; A63F 13/5255; A63F 13/5258; A63F 13/92; A63F 13/65
 See application file for complete search history.

(56) References Cited

U.S. PATENT DOCUMENTS

| | | | |
|---|---|---|---|
| 11,551,407 B1* | 1/2023 | Stanney | A63F 13/525 |
| 11,557,103 B2* | 1/2023 | Horita | G06T 15/20 |
| 2012/0075484 A1* | 3/2012 | Kawamoto | G06T 19/006 |
| | | | 348/207.1 |
| 2013/0215109 A1* | 8/2013 | Miesnieks | G06T 13/20 |
| | | | 345/419 |
| 2014/0092133 A1 | 4/2014 | Hayakawa | |
| 2014/0218361 A1* | 8/2014 | Abe | A63F 13/42 |
| | | | 345/424 |
| 2020/0103962 A1* | 4/2020 | Burns | G06T 3/20 |
| 2020/0160055 A1* | 5/2020 | Nakamura | G09B 29/10 |
| 2022/0152493 A1* | 5/2022 | Horita | A63F 13/92 |

FOREIGN PATENT DOCUMENTS

JP     2014-071877 A     4/2014

* cited by examiner

*Primary Examiner* — Seng H Lim

(74) *Attorney, Agent, or Firm* — Scully, Scott, Murphy & Presser, P.C.

(57) ABSTRACT

An example of an information processing system sets an image capturing direction of a virtual camera in accordance with an image capturing direction of a camera, and if the image capturing direction of the camera is within a predetermined range, moves a virtual door in a virtual space in accordance with the image capturing direction of the virtual camera. If the image capturing direction of the camera is directed more upward than a first threshold, the information processing system does not move the virtual door further in the up direction. If the image capturing direction of the camera is directed more downward than a second threshold, the information processing system does not move the virtual door further in the down direction.

17 Claims, 16 Drawing Sheets

F I G. 4
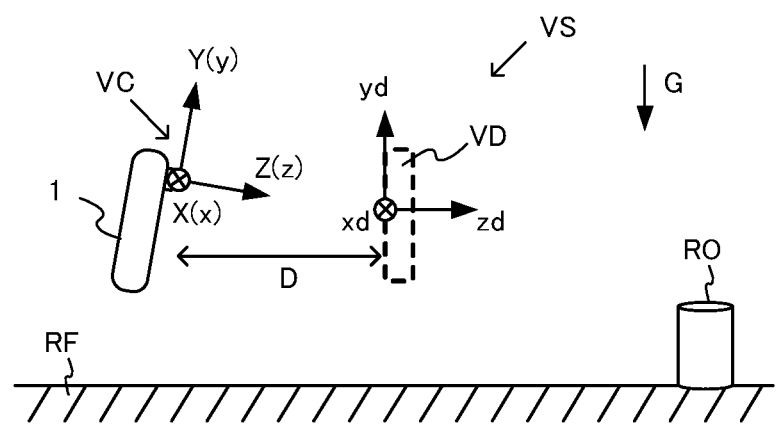

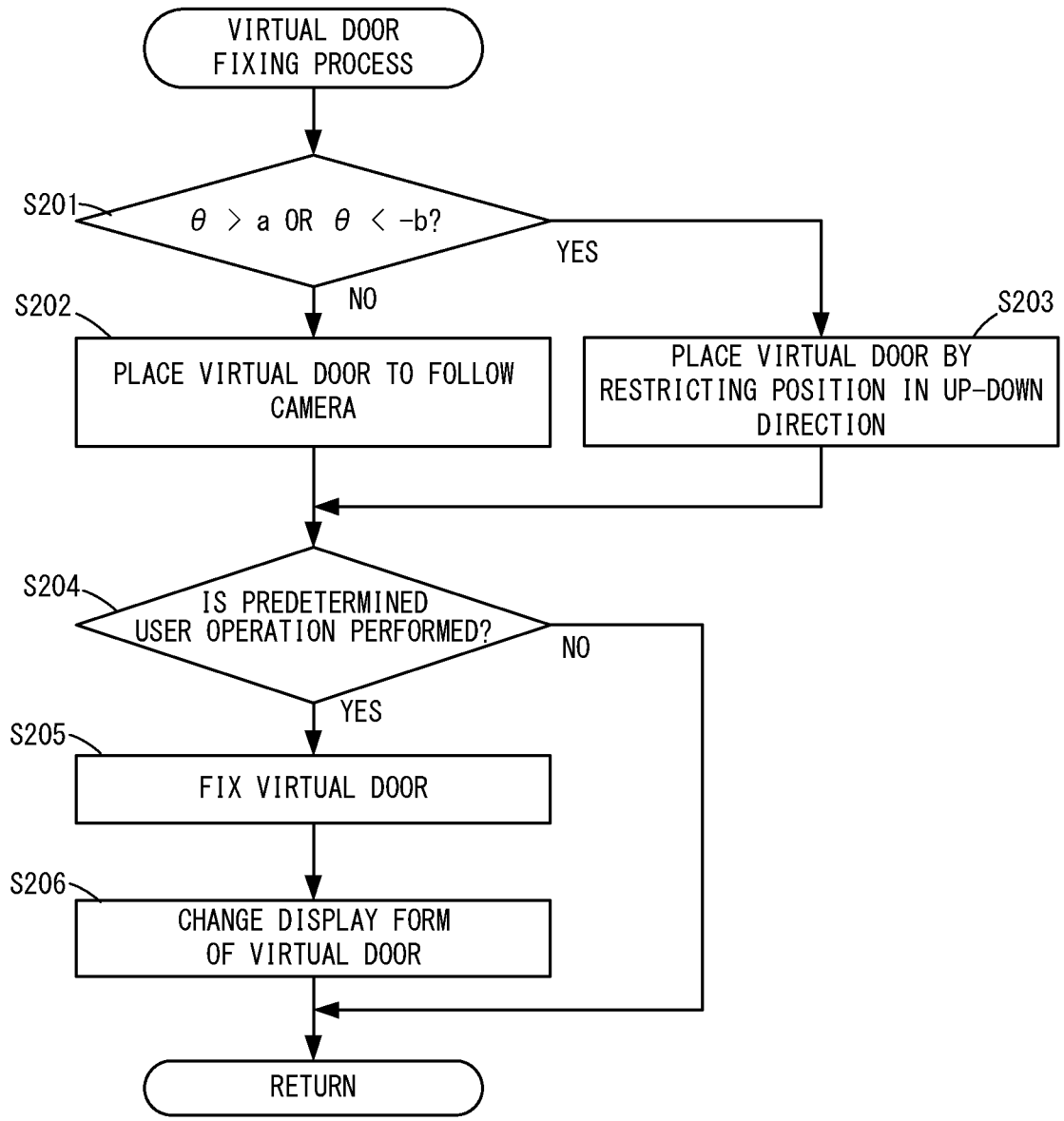

INFORMATION PROCESSING SYSTEM, NON-TRANSITORY COMPUTER-READABLE STORAGE MEDIUM HAVING STORED THEREIN INFORMATION PROCESSING PROGRAM, INFORMATION PROCESSING APPARATUS, AND INFORMATION PROCESSING METHOD

CROSS REFERENCE TO RELATED APPLICATION

This application claims priority to Japanese Patent Application No. 2020-190521 filed on Nov. 16, 2020, the entire contents of which are incorporated herein by reference.

FIELD

An exemplary embodiment relates to an information processing system, a non-transitory computer-readable storage medium having stored therein an information processing program, an information processing apparatus, and an information processing method that are capable of combining images of a real space and a virtual space.

BACKGROUND AND SUMMARY

As a related art, there is an image processing system that places a virtual object in a virtual space and displays images of a real space and the virtual object in a combined manner.

However, when the virtual object is placed, there is room for improvement in the placement of the virtual object at an appropriate position.

Therefore, it is an object of an exemplary embodiment to provide an information processing system, a non-transitory computer-readable storage medium having stored therein an information processing program, an information processing apparatus, and an information processing method that are capable of placing a virtual object at an appropriate position.

To achieve the above object, the exemplary embodiment employs the following configurations.

An example of the exemplary embodiment is an information processing system that outputs to a display device a combined image obtained by combining a real image obtained by an image capturing apparatus sequentially capturing a real space and a virtual image obtained by a virtual camera placed in a virtual space sequentially capturing a virtual object, the information processing system, including: at least one processor and a memory coupled thereto, the processor being configured to control the information processing system to at least: in a first control state, control at least either one of an image capturing direction of the virtual camera and a position of the virtual object in accordance with an image capturing direction of the image capturing apparatus so that the image capturing direction of the virtual camera and a virtual object direction that is a direction from the virtual camera to the virtual object are linked together at a first linkage level; based on a user operation, change the first control state to a second control state; in the second control state, control at least any one of a position of the virtual camera, the image capturing direction of the virtual camera, and the position of the virtual object in accordance with a position or the image capturing direction of the image capturing apparatus so that the virtual object viewed in the combined image is fixed in a simulated manner at a position in the real space; and in the first control state, if the image capturing direction of the image capturing apparatus is directed more upward than a first threshold or directed more downward than a second threshold in the real space, control at least either one of the image capturing direction of the virtual camera and the position of the virtual object so that the image capturing direction of the virtual camera and the virtual object direction are linked together at a second linkage level lower than the first linkage level.

Based on the above, in a first control state, in accordance with a change in an image capturing direction of an image capturing apparatus, it is possible to link an image capturing direction of a virtual camera and a virtual object direction. In accordance with a user operation, the first control state is changed to a second control state, and in the second control state, a virtual object is fixed in a simulated manner in a real space. Consequently, it is possible to fix the virtual object in a simulated manner at a desired position in the real space. In the first control state, if the image capturing direction of the image capturing apparatus is directed more upward than a first threshold, it is possible to make the degree to which the image capturing direction of the virtual camera and the virtual object direction are linked together lower than in a case where the image capturing direction of the image capturing apparatus is not directed more upward than the first threshold. Similarly, in the first control state, if the image capturing direction of the image capturing apparatus is directed more downward than a second threshold, it is possible to make the degree to which the image capturing direction of the virtual camera and the virtual object direction are linked together lower than in a case where the image capturing direction of the image capturing apparatus is not directed more downward than the second threshold. Consequently, it is possible to prevent the virtual object from being placed at an inappropriate position.

Further, the at least one processor may be configured to, in the second control state, if a positional condition regarding the position of the virtual camera and the position of the virtual object is satisfied, execute an event process regarding the virtual object.

Based on the above, if a positional condition regarding a position of the virtual camera and a position of the virtual object is satisfied, it is possible to execute an event process regarding the virtual object.

Further, if the virtual camera comes close to within a distance from the virtual object, the positional condition may be satisfied. A second virtual space may be set with respect to the position of the virtual object. The event process may be a process of determining that the virtual camera enters the second virtual space. If the virtual camera enters the second virtual space, in accordance with the position or the image capturing direction of the image capturing apparatus, the position or the image capturing direction of the virtual camera in the second virtual space may be controlled.

Based on the above, if the virtual camera comes close to the virtual object, it is determined that the virtual camera enters a second virtual space. If the virtual camera enters the second virtual space, in accordance with a change in a position or the image capturing direction of the image capturing apparatus, it is possible to change the position or the image capturing direction of the virtual camera in the second virtual space. Consequently, a user can bring the image capturing apparatus close to the virtual object, enter the second virtual space, and look over the inside of the second virtual space.

Further, in the first control state, if the image capturing direction of the image capturing apparatus changes in an up-down direction, the at least one processor may move the virtual object in the up-down direction while maintaining an orientation of the virtual object in a vertical direction in the virtual space.

Based on the above, even if the image capturing direction of the image capturing apparatus changes in an up-down direction in a first control state, it is possible to maintain the orientation of the virtual object in a vertical direction. For example, in the state where an up direction of the virtual object matches an up direction of a virtual space, it is possible to move the virtual object in the up-down direction.

Further, if the virtual object is fixed in a simulated manner, the at least one processor may change a state of the virtual object from a first state to a second state based on a user operation. If the virtual object is changed to the second state, the second virtual space may become able to be viewed from the virtual camera located in the virtual space.

Based on the above, in the state where the virtual object is fixed in a simulated manner, it is possible to change the virtual object to a second state. In the second state, it is possible to view the second virtual space.

Further, even if the image capturing direction of the image capturing apparatus is directed more upward than the first threshold or directed more downward than the second threshold, the at least one processor may control at least either one of the image capturing direction of the virtual camera and the position of the virtual object in accordance with a change in the image capturing direction of the image capturing apparatus in a left-right direction so that the image capturing direction of the virtual camera and the virtual object direction are linked together at the first linkage level.

Based on the above, even if the image capturing direction of the image capturing apparatus is directed too upward or directed too downward, the image capturing direction of the image capturing apparatus is directed in the left-right direction, whereby, for example, it is possible to direct the virtual camera in the left-right direction. Thus, it is possible to link the image capturing apparatus and the virtual object. This can improve usability.

Further, in the first control state, if the image capturing apparatus moves, the at least one processor may control the position of the virtual camera and the position of the virtual object so that the virtual camera and the virtual object maintain a certain distance from each other.

Based on the above, in the first control state, even if the image capturing apparatus moves, it is possible to maintain the distance between the virtual camera and the virtual object to be constant. Thus, it is possible to link the image capturing apparatus and the virtual object.

Further, in the first control state, the at least one processor may set the image capturing direction of the virtual camera in accordance with the image capturing direction of the image capturing apparatus and controls the position of the virtual object to follow a change in the image capturing direction of the virtual camera.

Based on the above, if the image capturing direction of the image capturing apparatus (the virtual camera) changes, it is possible to control the position of the virtual object by following the change in the image capturing direction. Thus, it is possible to link the image capturing apparatus and the virtual object.

Further, if the virtual object is fixed in a simulated manner in the real space, the at least one processor may change a display form of the virtual object.

Based on the above, it is possible to make it easy for the user to recognize that the virtual object is fixed in a simulated manner in the real space.

Further, the at least one processor may place the virtual object at a position in the image capturing direction of the virtual camera without detecting a plane in the real space based on the real image captured by the image capturing apparatus.

Based on the above, even if a plane in the real space is not detected, it is possible to place the virtual object in a virtual space.

Another exemplary embodiment is an information processing system that outputs to a display device a combined image obtained by combining a real image obtained by an image capturing apparatus sequentially capturing a real space and a virtual image obtained by a virtual camera placed in a virtual space sequentially capturing a virtual object, the information processing system, including: at least one processor and a memory coupled thereto, the processor being configured to control the information processing system to at least: control an image capturing direction of the virtual camera in accordance with an image capturing direction of the image capturing apparatus; control a position of the virtual object in a form of following the image capturing direction of the virtual camera; based on a user operation, control the position of the virtual object so that the position of the virtual object is fixed in a simulated manner at a position in the real space; in a state where the position of the virtual object is fixed, control a position of the virtual camera in accordance with a position of the image capturing apparatus; and if the image capturing direction of the image capturing apparatus is directed more upward than a first threshold or directed more downward than a second threshold in the real space, control the position of the virtual object so that a degree to which the virtual object follows the image capturing direction of the virtual camera decreases.

Based on the above, in accordance with a change in an image capturing direction of an image capturing apparatus, it is possible to set an image capturing direction of a virtual camera, and in accordance with a user operation, it is possible to fix a virtual object in a simulated manner in a real space. If the image capturing direction of the image capturing apparatus is directed more upward than a first threshold or directed more downward than a second threshold, it is possible to make the degree to which the virtual object follows the image capturing direction of the virtual camera low. Consequently, it is possible to prevent the virtual object from being placed at an inappropriate position.

Another exemplary embodiment may be a non-transitory computer-readable storage medium having stored therein an information processing program executed by one or more computers included in the above information processing system, or may be an information processing apparatus. Another exemplary embodiment may be an information processing method performed by the above information processing system.

According to the exemplary embodiment, it is possible to place a virtual object at a desired position and also prevent the virtual object from being placed at an inappropriate position.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 4 is an example non-limiting diagram showing an example of the positional relationships among the real space and various objects in a virtual space;

FIG. 24 is an example non-limiting flow chart showing the details of a virtual door fixing process in step S105.

DETAILED DESCRIPTION OF NON-LIMITING EXAMPLE EMBODIMENTS

An information processing system according to an exemplary embodiment is a system for allowing a user to view a combined image obtained by combining an image of a virtual space with an image of a real space and is a system for providing AR (Augmented Reality) to the user. For example, the information processing system may be a smartphone, a tablet terminal, a mobile game apparatus, a mobile personal computer, or the like. The information processing system is not limited to a mobile apparatus, and may be a stationary apparatus. In the exemplary embodiment, the information processing system is a smartphone.

Figure 1:
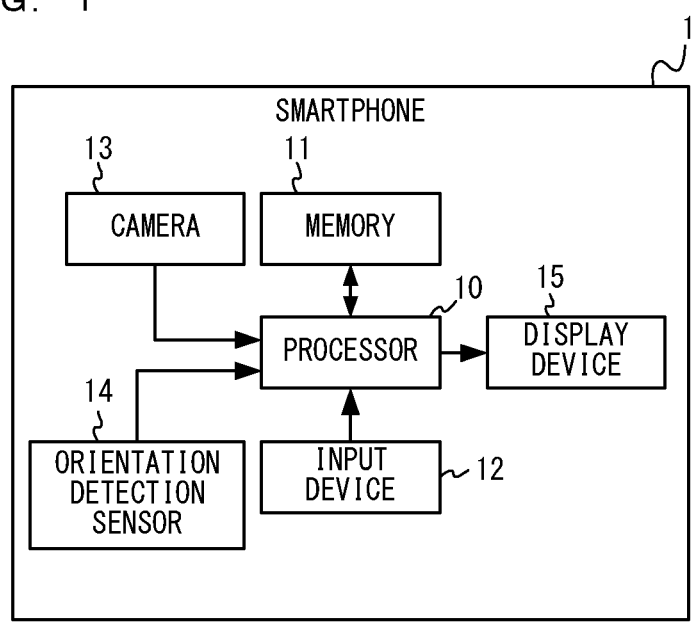
FIG. 1 is an example non-limiting diagram showing an example of the internal configuration of a smartphone 1 according to an exemplary embodiment.

FIG. 1 is a diagram showing an example of the internal configuration of a smartphone 1 according to the exemplary embodiment. As shown in FIG. 1, for example, the smartphone 1 includes a processor 10, a memory 11, an input device 12, a camera 13, an orientation detection sensor 14, and a display device 15. The smartphone 1 also includes a storage device (e.g., a non-volatile memory) (not shown).

The processor 10 cooperates with the memory 11 to process input information from the input device 12, process a real image from the camera 13, or process data from the orientation detection sensor 14, thereby calculating the orientation of the smartphone 1 (the camera 13). The processor 10 also performs a process regarding various objects in a virtual space described below, or generates a virtual image based on a virtual camera and generates a combined image obtained by combining the real image and the virtual image. The processor 10 outputs the generated combined image to the display device 15. The processor 10 may include a GPU (Graphics Processing Unit) for performing image processing.

The input device 12 receives an input from the user. For example, the input device 12 may be a touch panel or a button.

The camera 13 (an image capturing apparatus) is provided on a back surface of the smartphone 1 and captures a real space in the direction of the back surface.

The orientation detection sensor 14 is a sensor for detecting the orientation of the smartphone 1 (the camera 13), and for example, is an acceleration sensor and/or an angular velocity sensor.

The display device 15 is provided on a front surface of the smartphone 1, displays an image from the camera 13, and displays an image of a virtual space. For example, the display device 15 may be any display device such as a liquid crystal display or an organic EL display.

Figure 2:
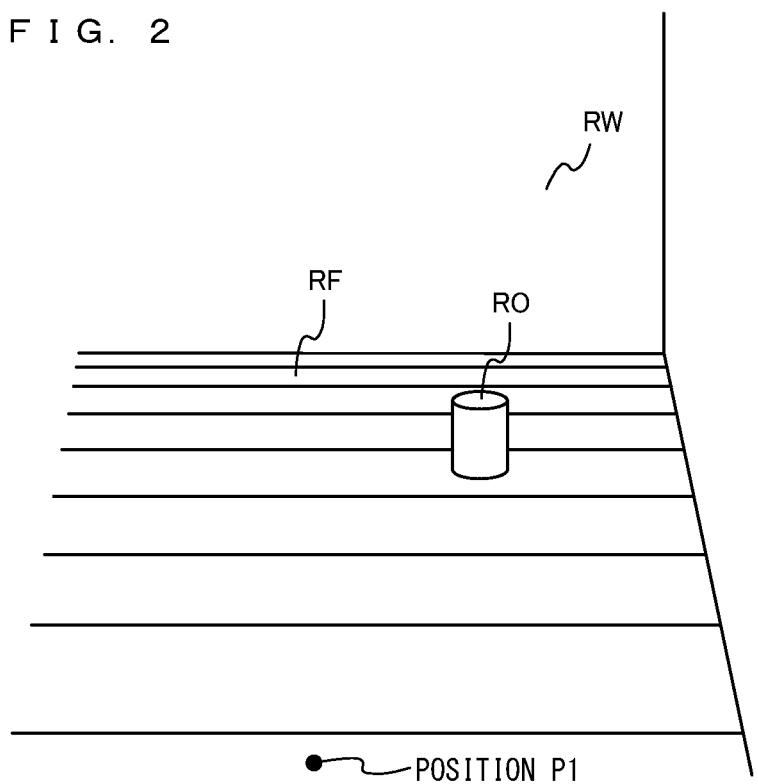
FIG. 2 is an example non-limiting diagram showing an example of a real space.
Figure 3:
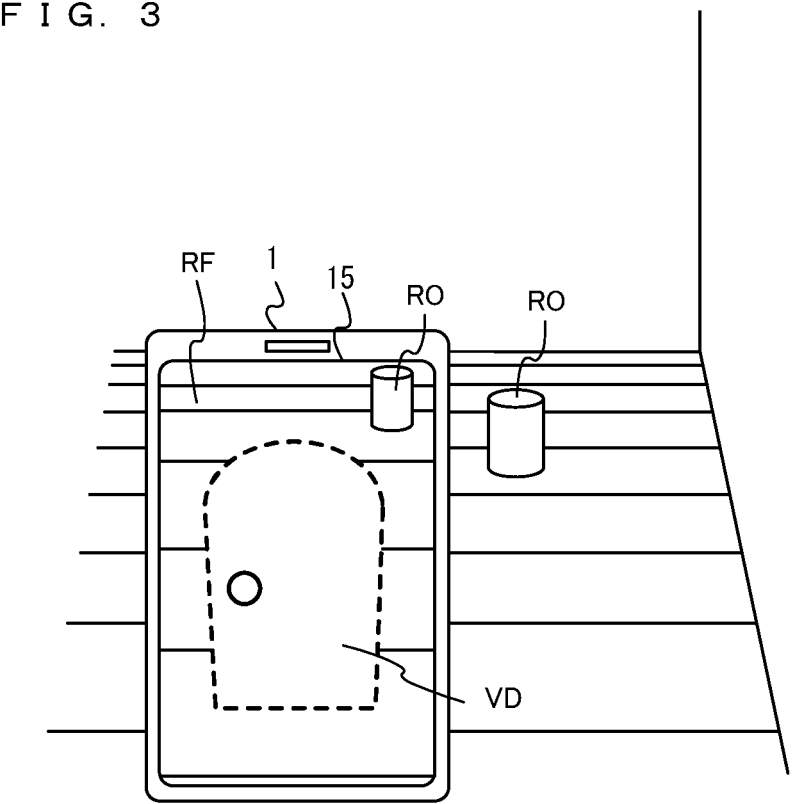
FIG. 3 is an example non-limiting diagram showing an example of an image displayed on a display device 15 when the smartphone 1 is placed at a position P1.

Next, images displayed on the display device 15 of the smartphone 1 are described. FIG. 2 is a diagram showing an example of a real space. FIG. 3 is a diagram showing an example of an image displayed on the display device 15 when the smartphone 1 is placed at a position P1.

As shown in FIG. 2, in the real space, for example, a floor RF, a cylindrical real object RO placed on the floor RF, and a wall RW are present. If the smartphone 1 is placed at a position P1 in the real space shown in FIG. 2, an image as shown in FIG. 3 is displayed on the display device 15.

On the display device 15 of the smartphone 1, an image of the real space (a real image) captured by the camera 13 is displayed. For example, on the display device 15, an image of the floor RF and an image of the real object RO are displayed as the real image. On the display device 15, a virtual door VD is also displayed. The virtual door VD is an example of a virtual object placed in a virtual space, and is not present in the real space. The virtual space is defined inside the smartphone 1, and the virtual door VD is placed in the virtual space. In the virtual space, a virtual camera is placed, and the virtual door VD is captured using the virtual camera, thereby generating a virtual image. The generated virtual image is superimposed on the real image from the camera 13, thereby generating a combined image. Then, the combined image is output to the display device 15. Consequently, a combined image as shown in FIG. 3 is displayed.

FIG. 4 is a diagram showing an example of the positional relationships among the real space and various objects in the virtual space. FIG. 4 shows an edge-on view of the real space and the virtual space when the image shown in FIG. 3 is displayed.

As shown in FIG. 4, a fixed XYZ coordinate system is defined in the smartphone 1. A Z-axis is an axis in the direction of the back surface of the smartphone 1 and is an axis directed in the image capturing direction of the camera 13. A Y-axis is an axis perpendicular to the Z-axis and is an axis directed in the up direction with respect to the smartphone 1 (the camera 13). An X-axis is an axis perpendicular to the Z-axis and the Y-axis and is an axis directed in the left direction with respect to the smartphone 1 (the camera 13).

The image capturing direction of the camera 13 (the orientation of the smartphone 1) is calculated based on data from the orientation detection sensor 14. Since the camera 13 is fixed to the smartphone 1, the orientation calculated based on the data from the orientation detection sensor 14 is both the orientation of the smartphone 1 and the orientation of the camera 13. For example, based on the force of gravity G detected by the orientation detection sensor 14, the smartphone 1 calculates the angle (θ) of the Z-axis to a horizontal plane (the floor RF).

In a virtual space VS, a virtual camera VC is placed. In the virtual camera VC, an xyz coordinate system is set. A z-axis of the virtual camera VC is an axis directed in the image capturing direction of the virtual camera VC. A y-axis of the virtual camera VC is an axis perpendicular to the z-axis and is an axis directed in the up direction with respect to the virtual camera VC. An x-axis of the virtual camera VC is an axis perpendicular to the z-axis and the y-axis and is an axis directed in the left direction with respect to the virtual camera VC.

The orientation of the camera 13 in the real space and the orientation of the virtual camera VC in the virtual space VS are linked together. Specifically, the orientation of the virtual camera VC is set to match the orientation of the smartphone 1 calculated based on the data from the orientation detection sensor 14 (e.g., the acceleration sensor and/or the angular velocity sensor). For example, if the camera 13 changes from a horizontal state to the state of being directed 10 degrees upward in the real space, the virtual camera VC also changes from a horizontal state to the state of being directed 10 degrees upward in the virtual space VS.

The position of the virtual door VD is controlled in the form of following the image capturing direction of the virtual camera VC. Specifically, as shown in FIG. 4, the virtual door VD is placed in the image capturing direction (the z-axis direction) of the virtual camera VC. The virtual door VD is a virtual object representing a door and is a plate-like virtual object. The virtual door VD is placed at a position a certain distance D away from the position of the virtual camera VC. For example, the center of the virtual door VD may be set at a position the certain distance D away from the virtual camera VC in the Z-axis direction.

A combined image obtained by combining a real image obtained by the camera 13 capturing the real space and a virtual image obtained by the virtual camera VC capturing the virtual door VD is displayed on the display device 15 of the smartphone 1. Thus, if the user views the combined image, it looks as if the virtual door VD was present in the real space.

In the virtual door VD, an xd-axis, a yd-axis, and a zd-axis are set. The zd-axis is an axis perpendicular to the virtual door VD, the yd-axis is an axis directed upward with respect to the virtual door VD, and the xd-axis is an axis directed leftward with respect to the virtual door VD. The virtual door VD is placed in the virtual space so as to be perpendicular to a horizontal plane in the virtual space VS (a horizontal plane in the real space). That is, the virtual door VD is placed in the virtual space so that the yd-axis, which is directed upward, of the virtual door VD and an axis directed upward in the virtual space are directed in the same direction.

Although the details will be described below, the virtual door VD is a virtual object as an entrance to a virtual room (a second virtual space).

Next, a description is given of an image displayed on the display device 15 when the orientation of the camera 13 (the smartphone 1) changes from the state shown in FIG. 3.

Figure 5:
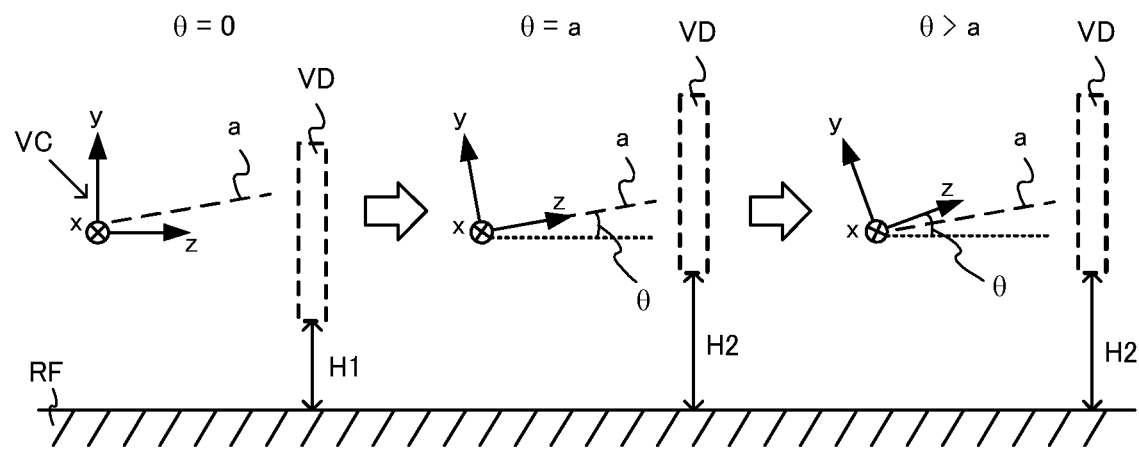
FIG. 5 is an example non-limiting diagram showing an example of a change in the virtual space when the image capturing direction of a camera 13 is changed upward.

FIG. 5 is a diagram showing an example of a change in the virtual space when the image capturing direction of the camera 13 is changed upward.

As shown in FIG. 5, if the angle θ between the z-axis of the virtual camera VC (the camera 13) and the horizontal plane is "0" degrees, the virtual door VD is placed so that the center of the virtual door VD is located at the position the certain distance D away from the position of the virtual camera VC (the camera 13) in the z-axis direction. At this time, for example, it looks as if the virtual door VD was present at a position at a height H1 from the horizontal plane (the floor RF). Hereinafter, when the camera 13 (the virtual camera VC) is directed upward, the angle θ has a positive value, and when the camera 13 (the virtual camera VC) is directed downward, the angle θ has a negative value.

If the image capturing direction of the camera 13 is changed upward so that the angle θ changes from 0 to a first threshold a (a is a positive value), the position of the virtual door VD changes by following the change in the image capturing direction of the camera 13. That is, the image capturing direction of the virtual camera VC changes in accordance with the image capturing direction of the camera 13 so that the image capturing direction of the virtual camera VC and a virtual object direction that is the direction from the virtual camera VC to the virtual door VD are linked together, and the position of the virtual door VD also changes. Thus, it looks to the user as if the camera 13 and the virtual door VD were linked together, and the virtual door VD moved by following the motion of the camera 13. Specifically, the virtual door VD moves in the up direction in the virtual space while maintaining the state of being perpendicular to the horizontal plane. That is, the virtual door VD moves in the up direction while maintaining the state where the yd-axis, which is directed upward, of the virtual door VD and the axis directed upward in the virtual space are parallel to each other. For example, from the state where θ=0 to the state where θ=a, the virtual door VD is placed in the virtual space so that the center of the virtual door VD is located at the position the certain distance D away from the position of the virtual camera VC in the z-axis direction. Meanwhile, the yd-axis, which is directed upward, of the virtual door VD is controlled to be directed in a direction opposite to the direction of gravity (the up direction in the virtual space). When θ=a, and if the display device 15 is viewed, for example, it looks as if the virtual door VD was present at a position at a height H2 (>H1) from the horizontal plane (the floor RF).

If the image capturing direction of the camera 13 is changed more upward from the state where θ=a, the image capturing direction of the virtual camera VC changes to match the image capturing direction of the camera 13. The position of the virtual door VD, however, does not change by following the change in the image capturing direction of the camera 13. That is, in the state where θ>a, the virtual door VD does not move further in the up direction, and the movement of the virtual door VD in the up direction is restricted.

As described above, on the premise that the image capturing direction of the virtual camera VC changes in accordance with a change in the image capturing direction of the camera 13, in the range of 0<θ<a, the virtual door VD moves in the up direction in linkage to the change in the image capturing direction of the virtual camera VC. On the other hand, if θ>a, i.e., if the image capturing direction of the virtual camera VC is directed more upward than the first threshold a, the movement of the virtual door VD in the up direction is restricted.

If the camera 13 (the smartphone 1) translates in the up, down, left, right, front, and back directions, the relative positional relationship between the virtual camera VC and the virtual door VD does not change. For example, if the camera 13 translates in the left-right direction while the image capturing direction remains fixed, the virtual camera VC also translates in the left-right direction in the virtual space, and the virtual door VD also translates in the left-right direction in the virtual space. The same applies to a case where the camera 13 translates in the up-down direction while the image capturing direction remains fixed.

If the camera 13 translates in the up, down, left, right, front, and back directions while the image capturing direction remains fixed, the virtual camera VC and the virtual door VD may not move in the virtual space. Also in this case, the relative positional relationship between the virtual camera VC and the virtual door VD does not change, and therefore, the virtual door VD remains displayed almost at the center of the display device 15. Thus, it looks as if the virtual door VD moved by following the movement of the camera 13.

Figure 6:
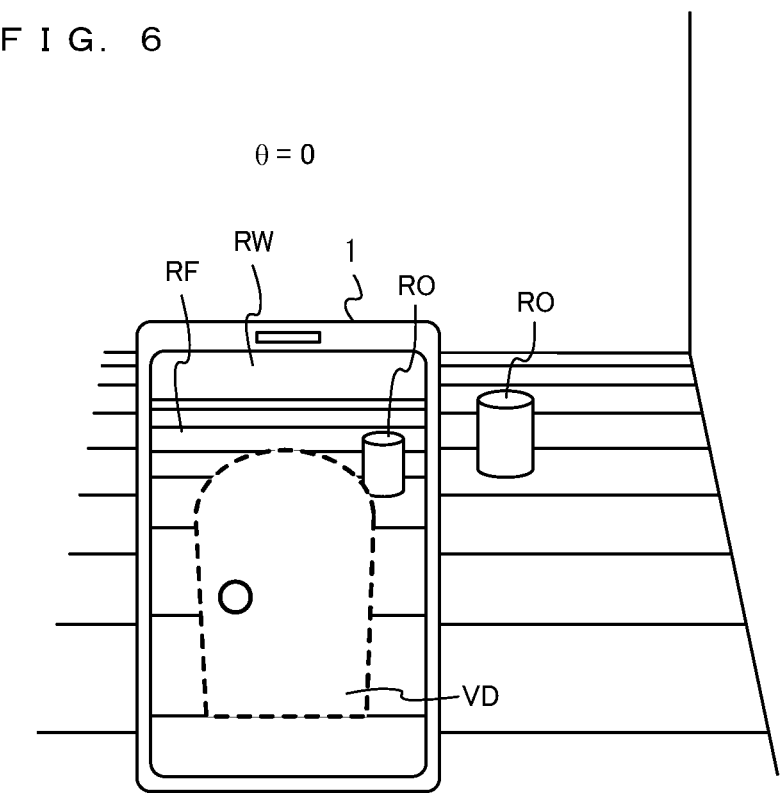
FIG. 6 is an example non-limiting diagram showing an example of an image displayed on the display device 15 when an angle θ of the image capturing direction of the camera 13 is "0"
Figure 7:
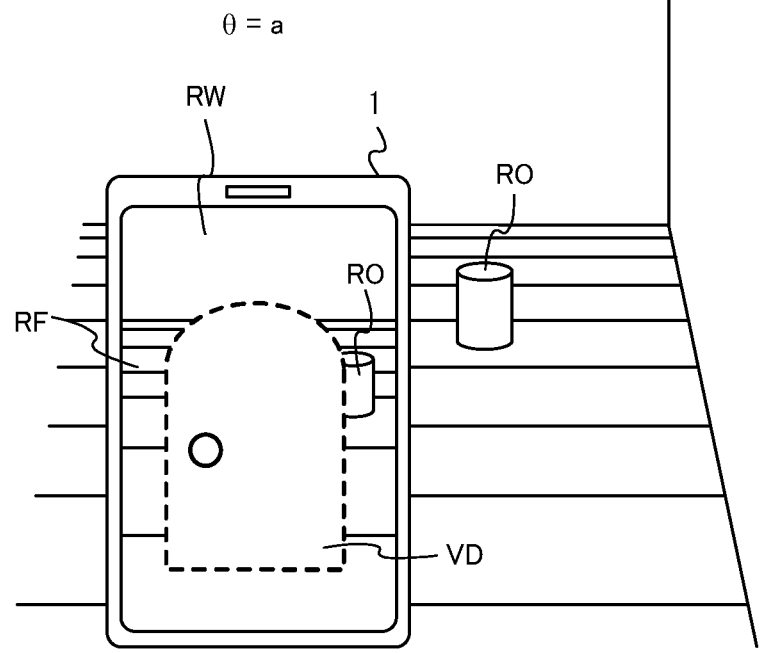
FIG. 7 is an example non-limiting diagram showing an example of an image displayed on the display device 15 when the angle θ of the image capturing direction of the camera 13 is a first threshold "a"
Figure 8:
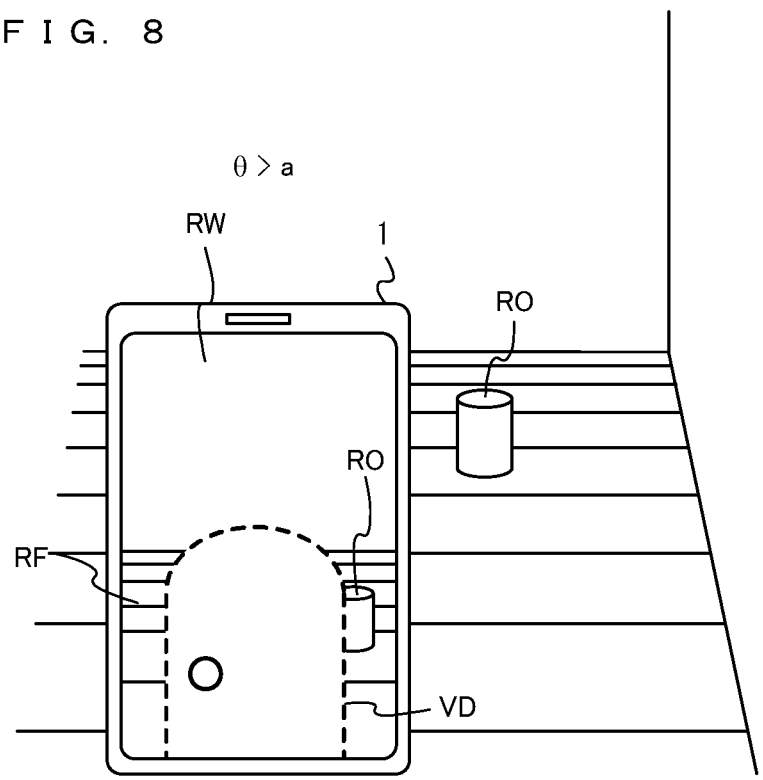
FIG. 8 is an example non-limiting diagram showing an example of an image displayed on the display device 15 when the angle θ of the image capturing direction of the camera 13 is greater than the first threshold "a"

FIG. 6 is a diagram showing an example of an image displayed on the display device 15 when the angle θ of the image capturing direction of the camera 13 is "0". FIG. 7 is a diagram showing an example of an image displayed on the display device 15 when the angle θ of the image capturing direction of the camera 13 is the first threshold "a". FIG. 8 is a diagram showing an example of an image displayed on the display device 15 when the angle θ of the image capturing direction of the camera 13 is greater than the first threshold "a".

In FIG. 6, the image capturing direction of the camera 13 is directed more upward than in FIG. 3, and therefore, the image of the real object RO is displayed further on the lower side of the screen than in FIG. 3. Although an image of the wall RW is not displayed in FIG. 3, the image of the wall RW is displayed in FIG. 6. As shown in FIG. 6, the virtual door VD is located in front of the virtual camera VC, and the virtual door VD is displayed almost at the center of the display device 15.

As shown in FIG. 7, also if θ=a, the virtual door VD is located in front of the virtual camera VC, and the virtual door VD is displayed almost at the center of the display device 15. While θ changes from 0 to a, the virtual door VD moves in the up direction by following the change in the image capturing direction of the virtual camera VC (the camera 13). That is, the virtual door VD viewed in the combined image displayed on the display device 15 moves in the up direction in linkage to the change in the image capturing direction of the camera 13. On the other hand, as shown in FIG. 7, the image of the real object RO is displayed further on the lower side than in FIG. 6. The region of the image of the wall RW is also larger than in FIG. 6.

As shown in FIG. 8, if θ>a, i.e., if the camera 13 is directed more upward than the first threshold, the virtual door VD is displayed on the lower side of the screen of the display device 15 without following the change in the image capturing direction of the camera 13 (the virtual camera VC). In FIG. 8, a lower portion of the virtual door VD is outside the image capturing range of the virtual camera VC, and the lower portion is not displayed on the display device 15. If the camera 13 is directed more upward than in FIG. 8, the virtual door VD comes out of the image capturing range of the virtual camera VC and is no longer displayed on the screen. In contrast, as shown in FIG. 8, the real image moves further to the lower side than in FIG. 7. The images of the real object RO and the floor RF are displayed further on the lower side than in FIG. 7, and the region of the image of the wall RW is larger than in FIG. 7.

Figure 9:
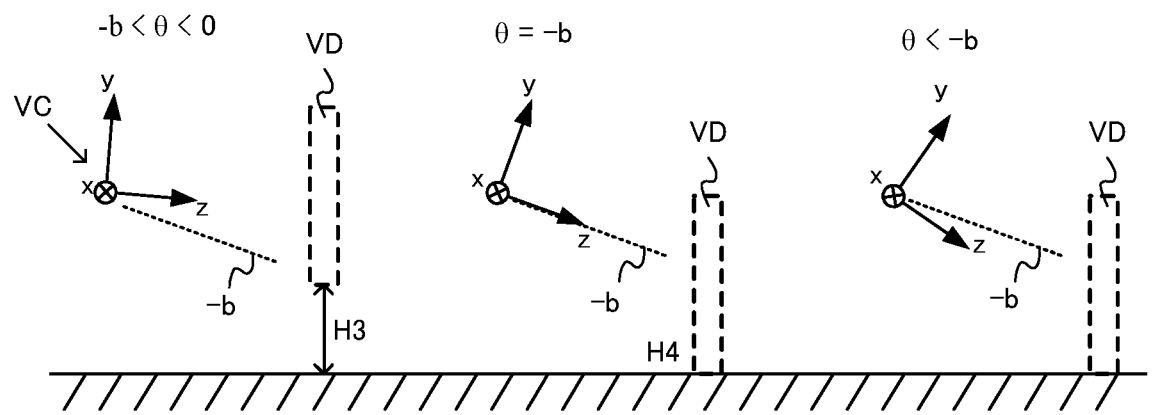
FIG. 9 is an example non-limiting diagram showing an example of a change in the virtual space when the image capturing direction of the camera 13 is changed downward.

Next, a description is given of a case where the camera 13 is directed in the down direction. FIG. 9 is a diagram showing an example of a change in the virtual space when the image capturing direction of the camera 13 is changed downward.

As shown in FIG. 9, if the angle θ is smaller than 0 (i.e., the camera 13 is directed downward) and greater than "−b (b is a positive value)" degrees, the virtual door VD is placed so that the center of the virtual door VD is located at the position the certain distance D away from the position of the virtual camera VC (the camera 13) in the z-axis direction. At this time, for example, it looks as if the virtual door VD viewed in the combined image displayed on the display device 15 was present at a position at a height H3 (<H1) from the horizontal plane (the floor RF).

If θ is changed to a second threshold "−b" (i.e., if the camera 13 is changed to an angle b in the down direction), the virtual door VD moves in the down direction by following the change in the image capturing direction of the camera 13. That is, the image capturing direction of the virtual camera VC changes in accordance with the image capturing direction of the camera 13 so that the image capturing direction of the virtual camera VC and the virtual object direction that is the direction from the virtual camera VC to the virtual door VD are linked together, and the position of the virtual door VD also changes. Thus, it looks to the user as if the camera 13 and the virtual door VD were linked together, and the virtual door VD moved by following the motion of the camera 13. Specifically, the virtual door VD moves in the down direction in the virtual space while maintaining the state of being perpendicular to the horizontal plane. Meanwhile, the yd-axis, which is directed upward, of the virtual door VD is controlled to be directed in a direction opposite to the direction of gravity (the up direction in the virtual space). In the state where $\theta=-b$, for example, it looks as if the virtual door VD was present at a position at a height H4 (<H3) from the horizontal plane (the floor RF).

If the image capturing direction of the camera 13 is changed more downward from the state where $\theta=-b$, the image capturing direction of the virtual camera VC changes to match the image capturing direction of the camera 13. The position of the virtual door VD, however, does not change by following the change in the image capturing direction of the camera 13. That is, in the state where $\theta<-b$, the virtual door VD does not move further in the down direction, and the movement of the virtual door VD in the down direction is restricted.

As described above, in the range of $-b<\theta<0$, the virtual door VD moves in the down direction in linkage to the change in the image capturing direction of the virtual camera VC. On the other hand, if $\theta<-b$, i.e., if the image capturing direction of the virtual camera VC is directed more downward than the second threshold b, the movement of the virtual door VD in the down direction is restricted.

Figure 10:
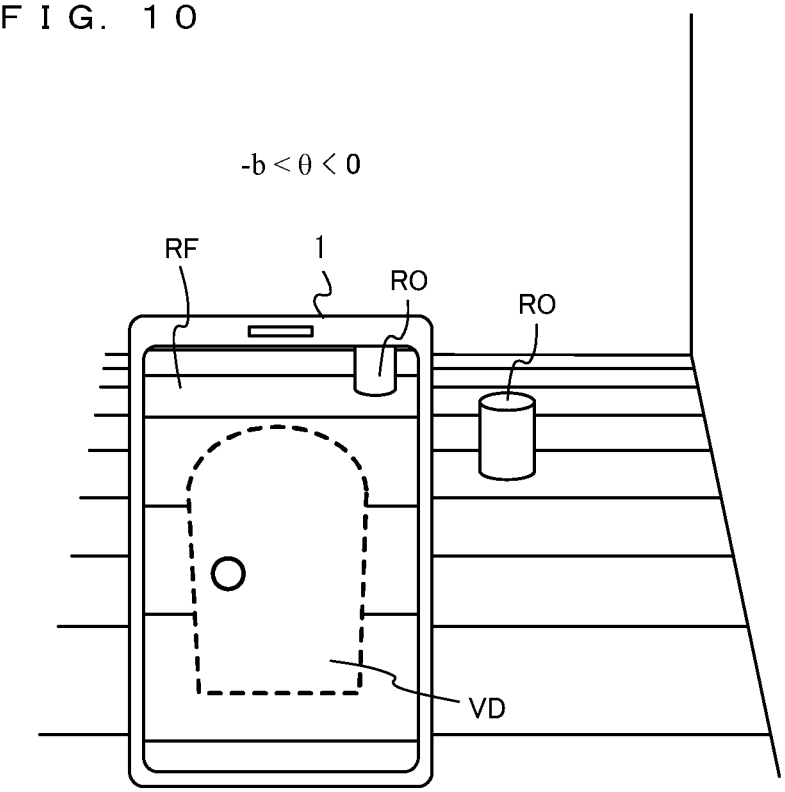
FIG. 10 is an example non-limiting diagram showing an example of an image displayed on the display device 15 when −b<θ<0.
Figure 11:
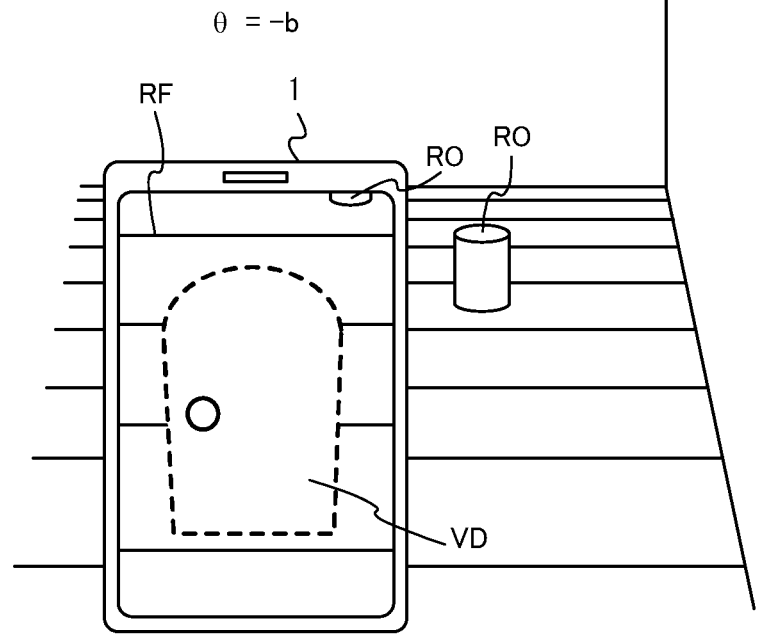
FIG. 11 is an example non-limiting diagram showing an example of an image displayed on the display device 15 when θ=−b.
Figure 12:
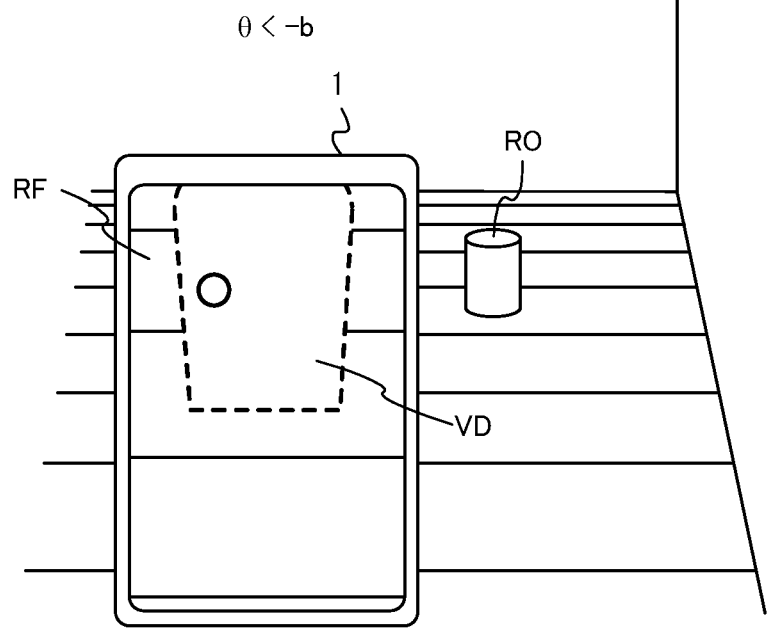
FIG. 12 is an example non-limiting diagram showing an example of an image displayed on the display device 15 when θ<−b.

FIG. 10 is a diagram showing an example of an image displayed on the display device 15 when $-b<\theta<0$. FIG. 11 is a diagram showing an example of an image displayed on the display device 15 when $\theta=-b$. FIG. 12 is a diagram showing an example of an image displayed on the display device 15 when $\theta<-b$.

In FIG. 10, the image capturing direction of the camera 13 is directed more downward than in FIG. 6, and therefore, the image of the real object RO is displayed further on the upper side of the screen than in FIG. 6, and a part of the real object RO is not displayed. In FIG. 10, the image of the wall RW is not displayed. As shown in FIG. 10, the virtual door VD is located in front of the virtual camera VC, and the virtual door VD is displayed almost at the center of the display device 15.

As shown in FIG. 11, if $\theta=-b$, the virtual door VD is located in front of the virtual camera VC, and the virtual door VD is displayed almost at the center of the display device 15. While $\theta$ changes from 0 to $-b$, the virtual door VD moves in the down direction by following the change in the image capturing direction of the virtual camera VC (the camera 13). That is, the virtual door VD viewed in the combined image displayed on the display device 15 moves in the down direction in linkage to the change in the image capturing direction of the camera 13. On the other hand, the image of the real object RO moves further to the upper side than in FIG. 10 and is hardly displayed.

As shown in FIG. 12, if $\theta<-b$, i.e., if the camera 13 is directed more downward than the second threshold, the virtual door VD is displayed on the upper side of the screen of the display device 15 without following the change in the image capturing direction of the camera 13 (the virtual camera VC). In FIG. 12, an upper portion of the virtual door VD is outside the image capturing range of the virtual camera VC, and the upper portion is not displayed on the display device 15. If the camera 13 is directed more downward than in FIG. 12, the virtual door VD comes out of the image capturing range of the virtual camera VC and is no longer displayed on the screen. In contrast, as shown in FIG. 12, the real image moves further to the lower side than in FIG. 11.

Figure 13:
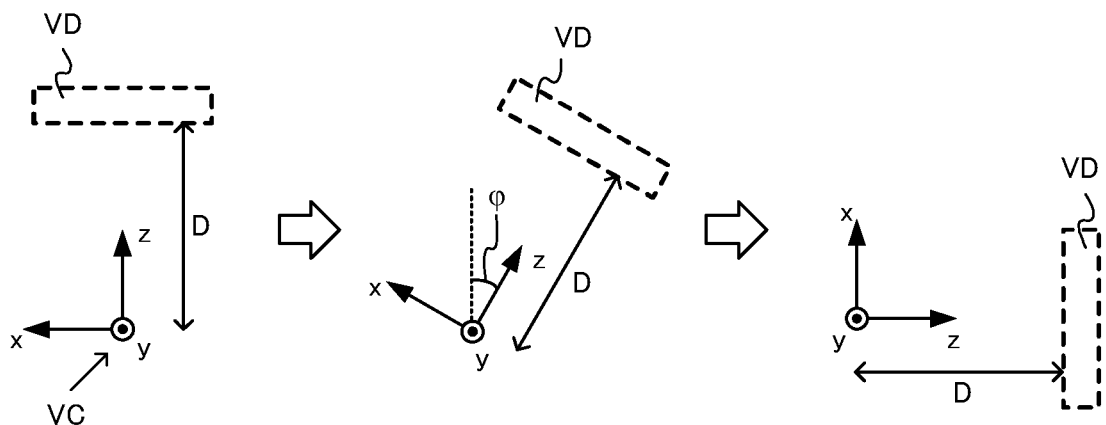
FIG. 13 is a diagram of the virtual space as viewed from above and is an example non-limiting diagram showing examples of the operations of a virtual camera VC and a virtual door VD when the image capturing direction of the camera 13 is changed in the right direction.

Next, a description is given of a case where the image capturing direction of the camera 13 is changed in the left-right direction. FIG. 13 is a diagram of the virtual space as viewed from above and is a diagram showing examples of the operations of the virtual camera VC and the virtual door VD when the image capturing direction of the camera 13 is changed in the right direction.

Also in a case where the image capturing direction of the camera 13 changes in the left-right direction, the image capturing direction of the virtual camera VC changes in the left-right direction. For example, if a rotational angle $\varphi$ in the right direction of the camera 13 (the smartphone 1) is 10 degrees, the virtual camera VC also rotates by 10 degrees in the right direction. As shown in FIG. 13, the virtual door VD also moves in the left-right direction in linkage to the rotation of the image capturing direction of the virtual camera VC in the left-right direction. Specifically, the virtual door VD moves in the left-right direction while changing its orientation to be directed to the virtual camera VC. For example, if the virtual camera VC rotates by a predetermined angle in the right direction (the camera 13 rotates by the predetermined angle in the right direction), the virtual door VD moves in the right direction while maintaining the distance D from the virtual camera VC. Also when the virtual door VD moves in the left-right direction in accordance with a change in the image capturing direction of the camera 13 in the left-right direction, the virtual door VD maintains its orientation perpendicular to the horizontal plane. That is, the virtual door VD moves in the left-right direction in the virtual space while maintaining the state where the yd-axis, which is directed upward, of the virtual door VD and the axis directed upward in the virtual space are parallel to each other.

In a case where the image capturing direction of the camera 13 changes in the left-right direction, the virtual door VD moves in the left-right direction in linkage to the motion of the image capturing direction of the virtual camera VC in the left-right direction, no matter what value the rotational angle $\varphi$ in the left-right direction has.

Figure 14:
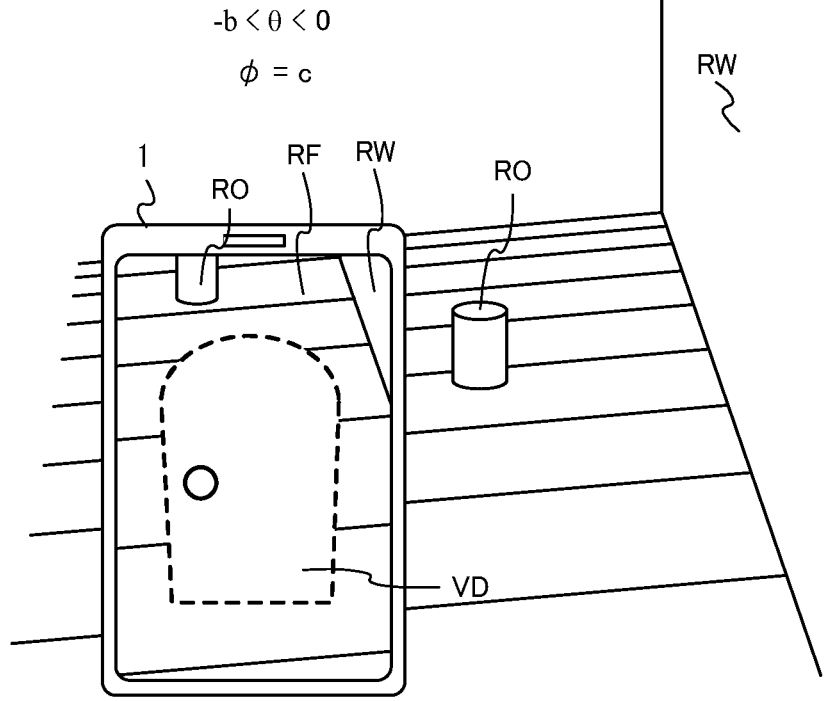
FIG. 14 is an example non-limiting diagram showing an example of an image displayed on the display device 15 when the smartphone 1 is rotated by c degrees in the right direction from the state in FIG. 10.
Figure 15:
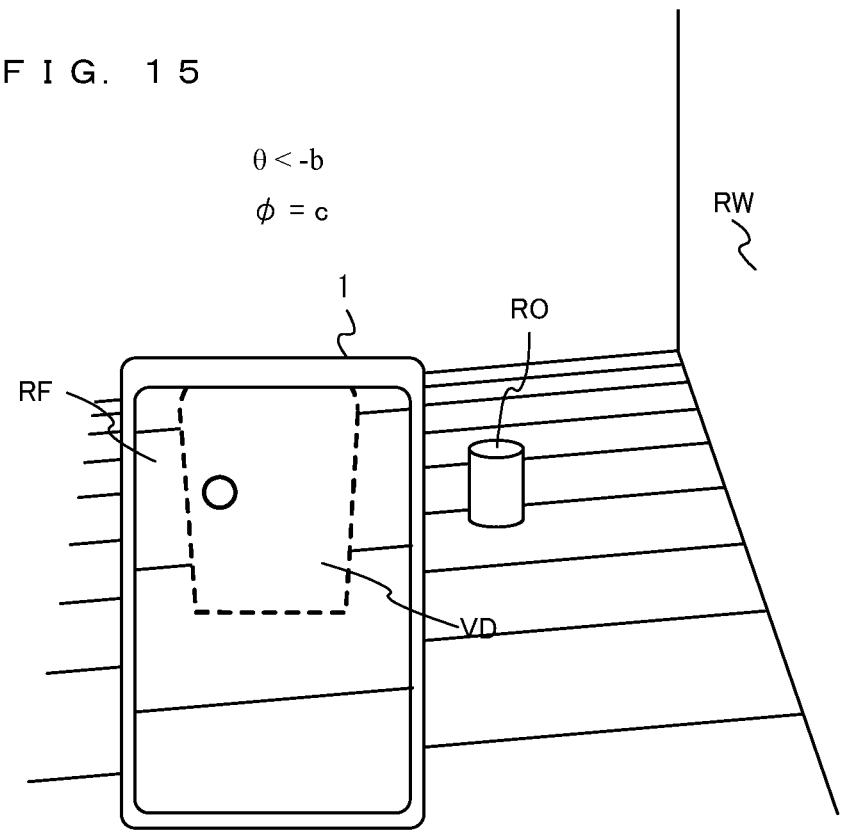
FIG. 15 is an example non-limiting diagram showing an example of an image displayed on the display device 15 when the smartphone 1 is rotated by the c degrees in the right direction from the state in FIG. 12.

FIG. 14 is a diagram showing an example of an image displayed on the display device 15 when the smartphone 1 is rotated by c degrees in the right direction from the state in FIG. 10. FIG. 15 is a diagram showing an example of an image displayed on the display device 15 when the smartphone 1 is rotated by the c degrees in the right direction from the state in FIG. 12.

As shown in FIG. 14, if the smartphone 1 is directed in the right direction from the state in FIG. 10, the real object RO in the real image moves to the left side of the screen, and a part of the wall RW on the right side of the real space is displayed on the screen. On the other hand, the virtual door VD is located in front of the virtual camera VC and displayed almost at the center of the display device 15.

As shown in FIG. 15, if the smartphone 1 is directed in the right direction from the state in FIG. 12, an image of the right side of the real space is displayed on the screen. The virtual door VD is located in front of the virtual camera VC and displayed almost at the center of the display device 15. As described above, even in the state where the camera 13 is directed more downward than the second threshold, in accordance with the state where the camera 13 is directed in the left-right direction, the virtual door VD also moves in the left-right direction. The same applies to the state where the camera 13 is directed more upward than the first threshold. That is, even in a case where the image capturing direction of the camera 13 is directed more upward than the first threshold or directed more downward than the second threshold, if the image capturing direction of the camera 13 changes in the left-right direction, in accordance with the change in the image capturing direction of the camera 13

(the virtual camera VC), the position of the virtual door VD also changes in the left-right direction.

(Fixing of Virtual Door VD)

Next, a description is given of a process after the virtual door VD is fixed in a simulated manner in the real space. As described above, if the image capturing direction of the camera 13 is changed in the state where the virtual door VD is displayed on the display device 15, the virtual door VD also moves in the virtual space by following the change. If the camera 13 is translated while the image capturing direction of the camera 13 remains fixed, the virtual door VD also moves by following the camera 13. Consequently, it looks as if the virtual door VD was linked to the camera 13, and the virtual door VD moved in the real space. If a predetermined user operation is performed on the input device 12 in this state, the virtual door VD is fixed in a simulated manner in the real space.

Figure 16:
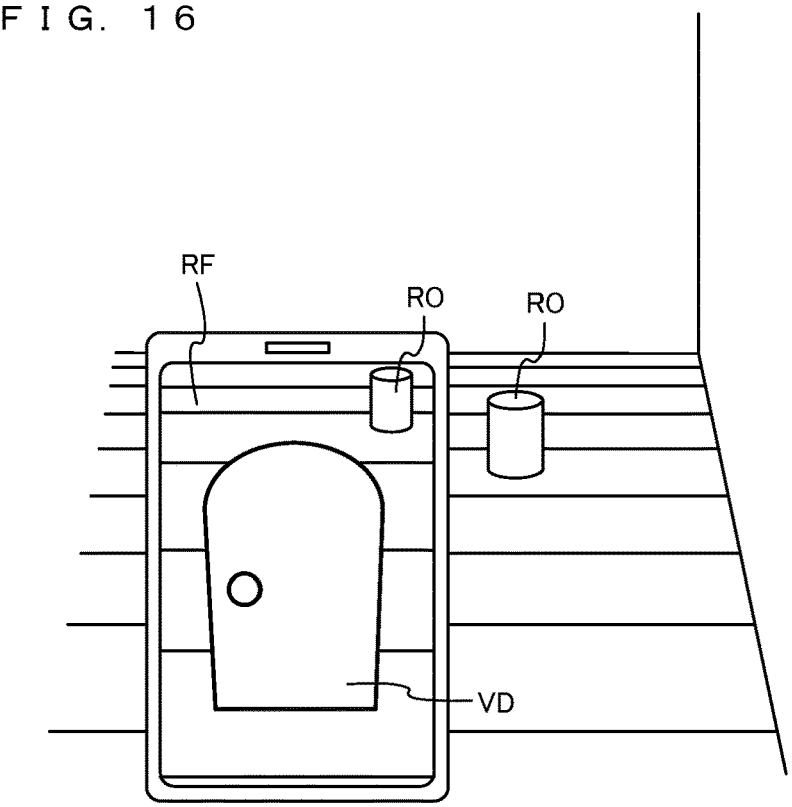
FIG. 16 is an example non-limiting diagram showing an example of an image displayed on the display device 15 after the virtual door VD is fixed in a simulated manner in the real space.

FIG. 16 is a diagram showing an example of an image displayed on the display device 15 after the virtual door VD is fixed in a simulated manner in the real space. As shown in FIG. 16, if a predetermined user operation (e.g., a touch input to the virtual door VD) is performed on the input device 12, the virtual door VD is fixed in a simulated manner, and the display form of the virtual door VD also changes. Before the predetermined user operation, the virtual door VD is displayed in a first display form (e.g., a form indicated by a dashed line as shown in FIG. 3), and in this state, the virtual door VD moves in accordance with a change in the image capturing direction of the camera 13. The predetermined user operation is not limited to a touch input, and may be a button input, a non-touch input (e.g., a gesture input), an input using voice, or the like.

After the predetermined user operation, the virtual door VD is displayed in a second display form (e.g., a form indicated by a solid line as shown in FIG. 16). In this state, the virtual door VD is fixed in a simulated manner in the real space. In a case where the virtual door VD is fixed in a simulated manner, and even if the image capturing direction of the camera 13 changes, the position of the virtual door VD does not change. If the camera 13 is translated, the virtual door VD does not move by following the camera 13.

Figure 17:
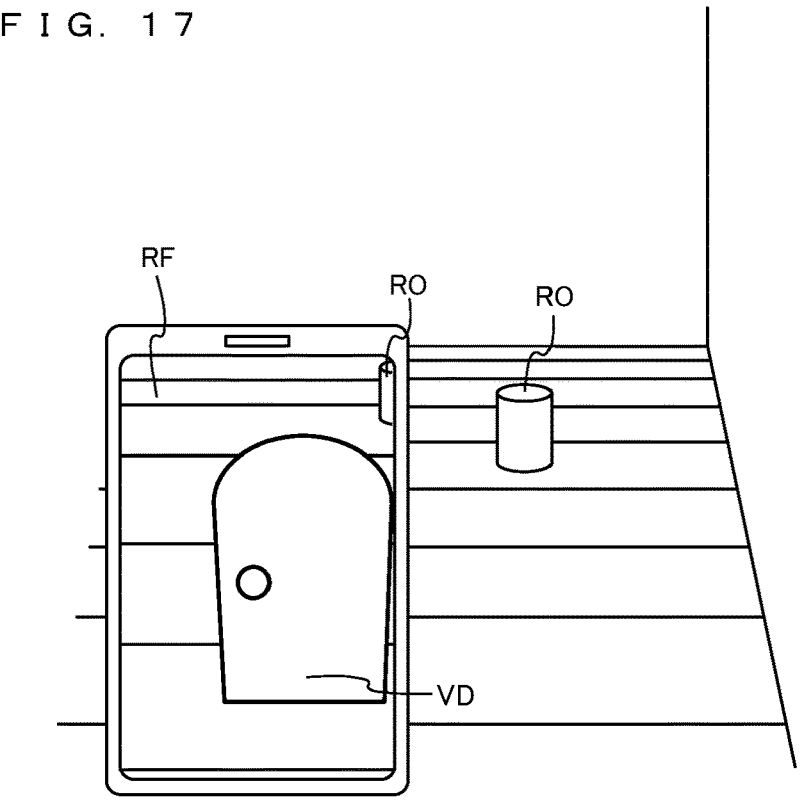
FIG. 17 is an example non-limiting diagram showing an example of an image displayed when the camera 13 is translated in the left direction from the state in FIG. 16.

FIG. 17 is a diagram showing an example of an image displayed when the camera 13 is translated in the left direction from the state in FIG. 16. As shown in FIG. 17, in a case where the virtual door VD is fixed in a simulated manner in the real space, and even if the camera 13 translates in the left direction, the virtual door VD does not translate in the left direction. Specifically, in FIG. 17, the real object RO moves in the right direction in the screen in accordance with the translation of the camera 13 in the left direction, and a part of the real object RO is displayed at the right end. With the movement of the real object RO in the screen, the virtual door VD also moves in the right direction in the screen. The amount of movement of the real object RO and the amount of movement of the virtual door VD in the screen are the same as each other. Consequently, it looks as if the virtual door VD was fixed in a simulated manner in the real space.

Specifically, if a vx-vy-vz orthogonal coordinate system fixed in the virtual space is set, and a predetermined user operation is performed, the vx-vy-vz coordinate value of the virtual door VD is fixed. On the other hand, the virtual camera VC moves in the virtual space in accordance with the movement of the camera 13. The image capturing direction of the virtual camera VC is set to match the image capturing direction of the camera 13. The virtual camera VC moves by following the camera 13 in the virtual space, and the image capturing direction of the virtual camera VC is changed, while the virtual door VD is fixed in the virtual space. Thus, it looks as if the virtual door VD displayed on the display device 15 was fixed in a simulated manner in the real space.

The position of the virtual camera VC is calculated based on a real image from the camera 13 acquired at predetermined time intervals (e.g., ¹⁄₆₀-second intervals). Based on the sequentially acquired real image, the motion (movement) of the camera 13 is calculated, and the position of the virtual camera VC is set to match the motion (movement) of the camera 13. The motion (movement) of the camera 13 may be calculated based on an output from the orientation detection sensor 14 in addition to (or instead of) the real image from the camera 13. For example, based on an acceleration output from the orientation detection sensor 14, the amount of movement and the moving direction of the camera 13 may be calculated. Then, based on the calculated amount of movement and moving direction, the virtual camera VC may be moved in the virtual space. If the virtual door VD is fixed, the camera 13 (the virtual camera VC) is moved, whereby the relative positional relationship between the virtual camera VC and the virtual door VD changes.

The vx-vy-vz coordinate system fixed in the virtual space may be set with respect to the virtual door VD when the virtual door VD is fixed. For example, the origin of the vx-vy-vz coordinate system may be set at the position of the virtual door VD, a vy-axis may be set in a direction opposite to the direction of gravity, and a vx-axis may be set to be parallel to the xd-axis of the virtual door VD. The vx-vy-vz coordinate system may be fixed in the virtual space before the virtual door VD is fixed. For example, if a real image is acquired from the camera 13, and based on the real image and the direction of gravity, a plane in the real space may be detected, and the origin of the vx-vy-vz coordinate system may be set on the plane. The vy-axis may be set in a direction opposite to the direction of gravity, and the detected plane may be set as a vx-vz plane. A marker may be placed in the real space, and based on a marker image included in the real image from the camera 13, the vx-vy-vz coordinate system may be set.

(Second Virtual Space)

As described above, if the virtual door VD is fixed in a simulated manner in the real space (if the virtual door VD is fixed in the virtual space), a second virtual space with respect to the virtual door VD is generated.

Figure 18:
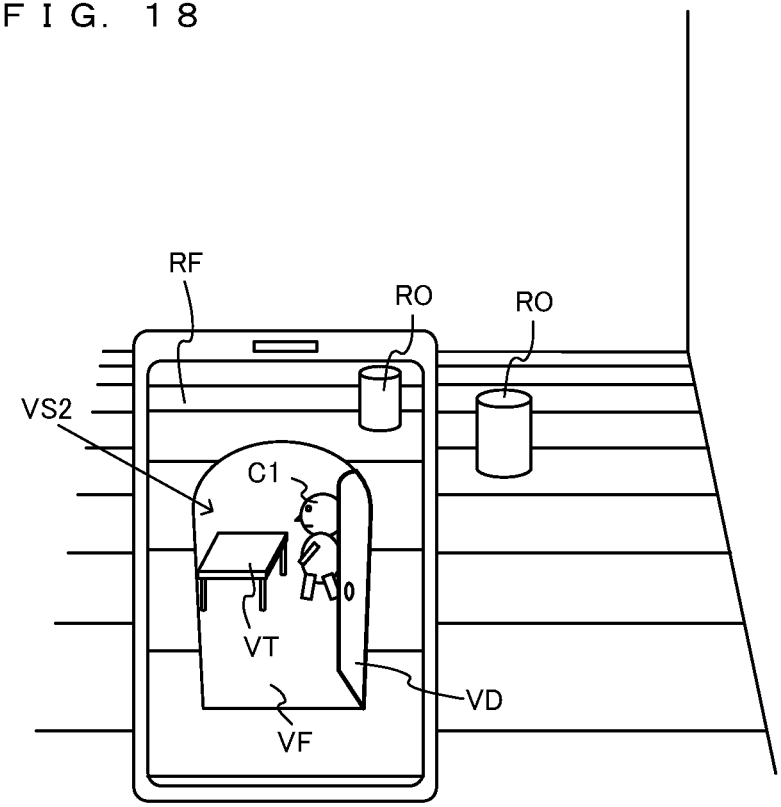
FIG. 18 is an example non-limiting diagram showing an example of a part of a second virtual space seen through the virtual door VD.

FIG. 18 is a diagram showing an example of a part of the second virtual space seen through the virtual door VD. After the virtual door VD is fixed, for example, in accordance with an input to the input device 12 provided by the user, the virtual door VD changes from a closed state (a first state) shown in FIG. 16 to an open state (a second state) shown in FIG. 18. If the virtual door VD changes to the open state, the inside of a second virtual space VS2 can be viewed. As shown in FIG. 18, an image obtained by combining the real image of the real space, an image of the virtual door VD, and an image of the second virtual space VS2 is displayed. Specifically, as shown in FIG. 18, in a region other than the virtual door VD, the image of the real space is displayed, and the images of the real object RO and the floor RF are displayed. In an open portion of the virtual door VD, an image of the inside of a virtual room representing the second virtual space VS2 is displayed. In the second virtual space VS2, a virtual table VT and a virtual character C1 are placed on a virtual floor VF.

Figure 19:
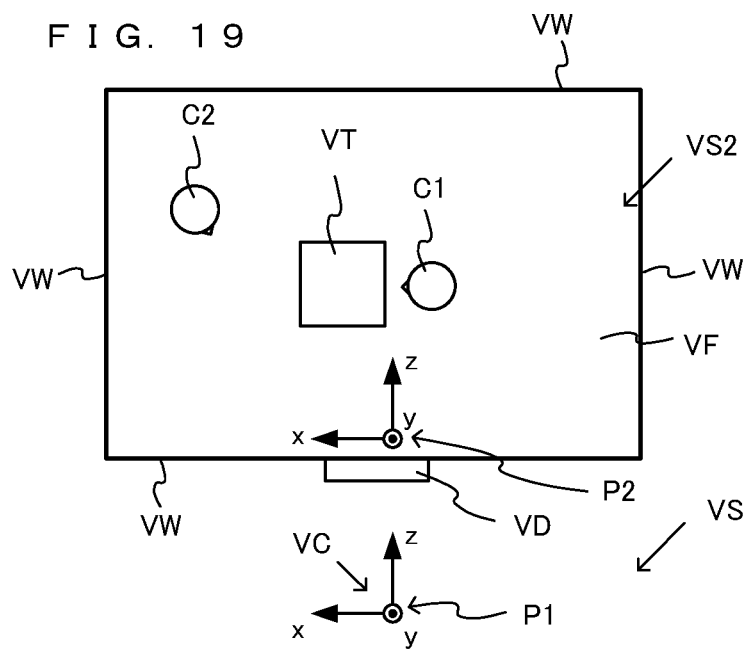
FIG. 19 is an example non-limiting diagram showing an example of the positional relationships among the virtual door VD, the virtual camera VC, and a second virtual space VS2.

FIG. 19 is a diagram showing an example of the positional relationships among the virtual door VD, the virtual camera VC, and the second virtual space VS2. FIG. 19 shows a diagram of the entirety of the virtual space including the second virtual space VS2 as viewed from above.

As shown in FIG. 19, in a case where the virtual camera VC is placed at a position P1, and if the virtual door VD is in the open state, the image shown in FIG. 18 is displayed. In this state, the virtual camera VC is outside the second virtual space VS2 and cannot freely move in the second virtual space VS2.

The second virtual space VS2 is set in accordance with the position of the virtual door VD. The second virtual space VS2 is a virtual room surrounded by the virtual floor VF, four virtual walls VW, and a virtual ceiling. The outside of the second virtual space VS2 is the virtual space VS, and the virtual door VD is located between the inside and the outside of the second virtual space VS2. The second virtual space VS2 is related to a predetermined range in the real space. For example, the second virtual space VS2 is related to a range of several tens of centimeters square to several meters square in the real space and give the user a feeling as if the second virtual space VS2 was present in this range.

In the second virtual space VS2, the virtual table VT, the virtual character C1, and a virtual character C2 are placed. In addition to these, various objects (e.g., furniture objects) may be placed in the second virtual space VS2. The virtual floor VF of the second virtual space VS2 is set to be perpendicular to the virtual door VD. That is, the virtual floor VF and the yd-axis of the virtual door VD are orthogonal to each other.

If the camera 13 is moved in the image capturing direction from the state where the virtual camera VC and the virtual door VD are a predetermined distance away from each other as shown in FIG. 16 or 18, the virtual camera VC also moves in the z-axis direction, and the virtual camera VC comes close to the virtual door VD. If the virtual camera VC and the virtual door VD satisfy a predetermined positional condition (if the virtual camera VC comes close to within a predetermined distance from the virtual door VD), the virtual camera VC can enter the second virtual space VS2. For example, if the distance between the virtual camera VC and the virtual door VD is less than a predetermined value, and the position in the left-right direction of the virtual camera VC is within the range of the width of the virtual door VD, and the position in the up-down direction of the virtual camera VC is within the range of the height of the virtual door VD, the predetermined positional condition for the virtual camera VC and the virtual door VD is satisfied. That is, if the virtual camera VC (the camera 13) comes close to the position of the virtual door VD, and the virtual camera VC is not shifted from the position of the virtual door VD in either of the up-down direction and the left-right direction, the predetermined positional condition is satisfied.

Even if the virtual camera VC comes close to the second virtual space VS2 from a position different from the virtual door VD, the virtual camera VC cannot enter the second virtual space VS2. That is, if the camera 13 is moved into a predetermined range in the real space through the position of the virtual door VD, the virtual camera VC enters the second virtual space VS2, and an image of the inside of the second virtual space VS2 is displayed. If, however, the camera 13 is moved into the predetermined range in the real space through a position other than the virtual door VD, the virtual camera VC does not enter the second virtual space VS2. In this case, the real image from the camera 13 is displayed.

If the virtual camera VC reaches the position of the virtual door VD, and the virtual camera VC (the camera 13) moves further in the image capturing direction, the virtual camera VC moves to a position P2 in the second virtual space VS2.

Figure 20:
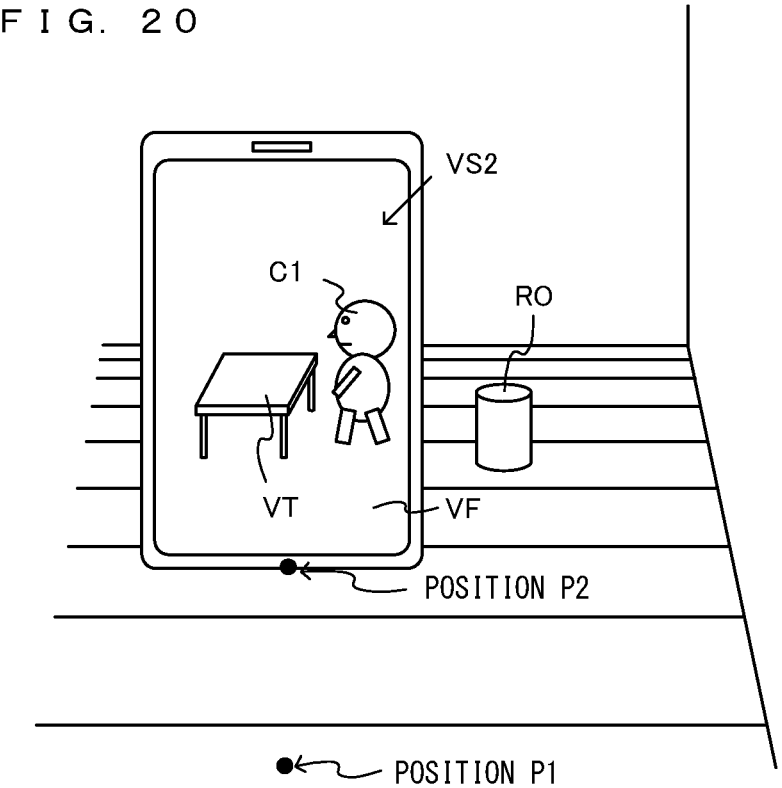
FIG. 20 is an example non-limiting diagram showing an example of an image displayed in a case where the virtual camera VC is placed at a position P2 shown in FIG. 19.

FIG. 20 is a diagram showing an example of an image displayed in a case where the virtual camera VC is placed at the position P2 shown in FIG. 19.

As shown in FIG. 20, if the virtual camera VC enters the second virtual space VS2, the real image from the camera 13 is not displayed, and a virtual image of the inside of the second virtual space VS2 based on the virtual camera VC is displayed on the entirety of the screen. In the example shown in FIG. 20, the virtual table VT and the virtual character C1 are displayed. If the camera 13 is further moved in this state, the virtual camera VC moves in the second virtual space VS2. The movement of the camera 13 is detected based on the real image sequentially acquired from the camera 13. That is, if the virtual camera VC is in the second virtual space VS2, the real image is not displayed on the screen, but the real image is sequentially acquired from the camera 13, and based on the acquired real image, the movement of the camera 13 (the smartphone 1) is detected. If the image capturing direction of the camera 13 is changed, in accordance with the change, the image capturing direction of the virtual camera VC also changes in the second virtual space VS2.

As described above, in the exemplary embodiment, the virtual camera VC is caused to operate in the virtual space in accordance with the motion of the camera 13, and the virtual door VD in the virtual space is displayed in a superimposed manner on the real image from the camera 13, whereby it is possible to display the virtual door VD as if the virtual door VD was present in the real space. The user performs a predetermined user operation and thereby can fix the virtual door VD in the virtual space and fix the virtual door VD in a simulated manner in the real space. The user can also enter the second virtual space VS2 through the virtual door VD as an entrance and view the inside of the second virtual space VS2.

Before the predetermined user operation is performed, the user moves the camera 13 or changes the image capturing direction of the camera 13 and thereby can move the virtual door VD in the virtual space. Thus, the user can place an entrance to the second virtual space VS2 at a desired position in the real space.

Here, for example, in a case where the virtual door VD is always placed at a predetermined position in the image capturing direction of the camera 13 (the virtual camera VC), and if the camera 13 is directed too upward, the virtual door VD is located at a high position in the real space.

Figure 21:
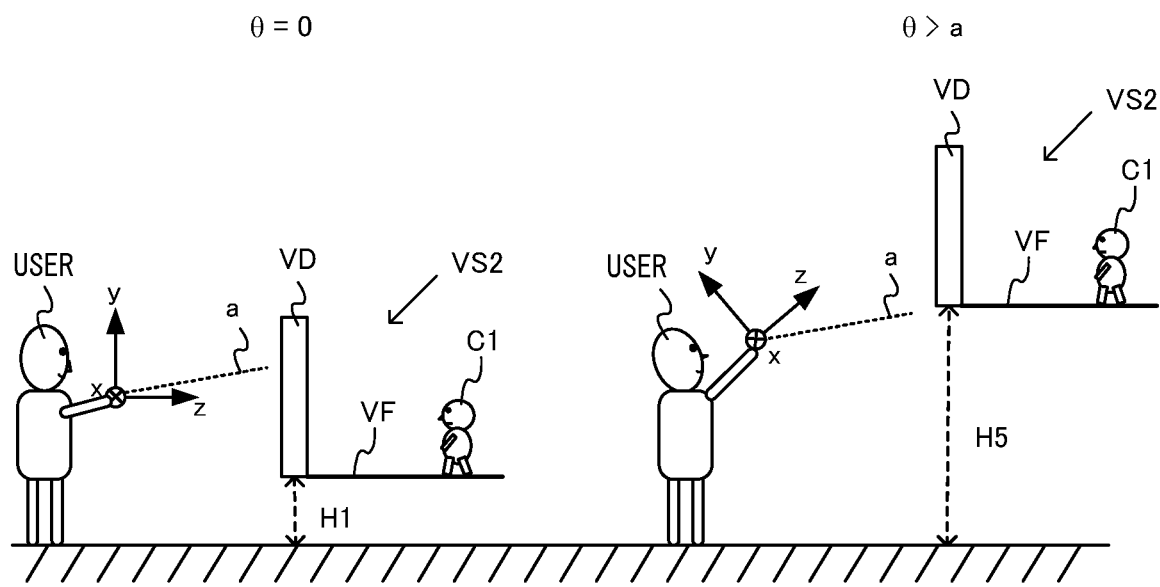
FIG. 21 is an example non-limiting diagram of the real space as viewed from a lateral direction in a case where the virtual door VD is moved in linkage to the image capturing direction of the virtual camera VC without restricting the movement of the virtual door VD.

FIG. 21 is a diagram of the real space as viewed from a lateral direction in a case where the virtual door VD is moved in linkage to the image capturing direction of the virtual camera VC without restricting the movement of the virtual door VD.

As shown in FIG. 21, if $\theta=0$, the virtual door VD is placed at a predetermined position in the image capturing direction of the virtual camera VC. Then, if the user views the display device 15, it looks as if a bottom surface of the virtual door VD was located at the position at the height H1 in the real space. If the virtual door VD is fixed at this position, the second virtual space VS2 is set so that the virtual floor VF of the second virtual space VS2 is located at the position at the height H1. If the user brings the camera 13 close to the virtual door VD fixed in a simulated manner in the real space, the user can cause the virtual camera VC to enter the second virtual space VS2. The user moves the camera 13 and thereby can look over the inside of the second virtual space VS2.

On the other hand, in a case where $\theta$ is greater than the first threshold a, and if the movement of the virtual door VD in the up direction is not restricted, the position of the bottom surface of the virtual door VD is a height H5. In this case, the user looks up at the real space. If the virtual door VD is fixed in this state, the virtual floor VF of the second virtual space VS2 is fixed at a position in the up direction in the real space. If the virtual floor VF of the second virtual space VS2 is fixed to a position out of reach of the user, it is difficult for the user to bring the camera 13 (the smartphone 1) close to the virtual door VD, and it is difficult for the user to cause the virtual camera VC to enter the second virtual space VS2. Even if the user succeeds in passing the camera 13 through the virtual door VD, it is difficult to move the camera 13 to look over the second virtual space VS2 at a high position.

Thus, in the exemplary embodiment, if θ is greater than the first threshold a, i.e., if the image capturing direction of the camera 13 is directed more upward than the first threshold a, the movement of the virtual door VD in the up direction is restricted. Consequently, it is possible to prevent the virtual door VD from being fixed at too high a position in the real space, and it is possible to make it easy to cause the virtual camera VC to enter the second virtual space VS2 and look over the second virtual space VS2.

The same applies to a case where the virtual door VD moves in the down direction without restricting the movement of the virtual door VD. In a case where the camera 13 is directed too downward, and if the movement of the virtual door VD in the down direction is not restricted, the bottom surface of the virtual door VD may be located below the floor in the real space. If the virtual door VD is fixed in this state, the virtual floor VF of the second virtual space VS2 is fixed at a position lower than the floor in the real space. Thus, it is not possible for the user to bring the camera 13 (the smartphone 1) close to the position of the virtual door VD, and it is not possible for the user to enter the second virtual space VS2.

Thus, in the exemplary embodiment, if θ is smaller than the second threshold −b, i.e., if the image capturing direction of the camera 13 is directed more downward than the second threshold b, the movement of the virtual door VD in the down direction is restricted. Consequently, it is possible to prevent the virtual door VD from being placed at a position lower than the floor in the real space, and it is possible to enter the second virtual space VS2.

(Data Stored in Smartphone)

Figure 22:
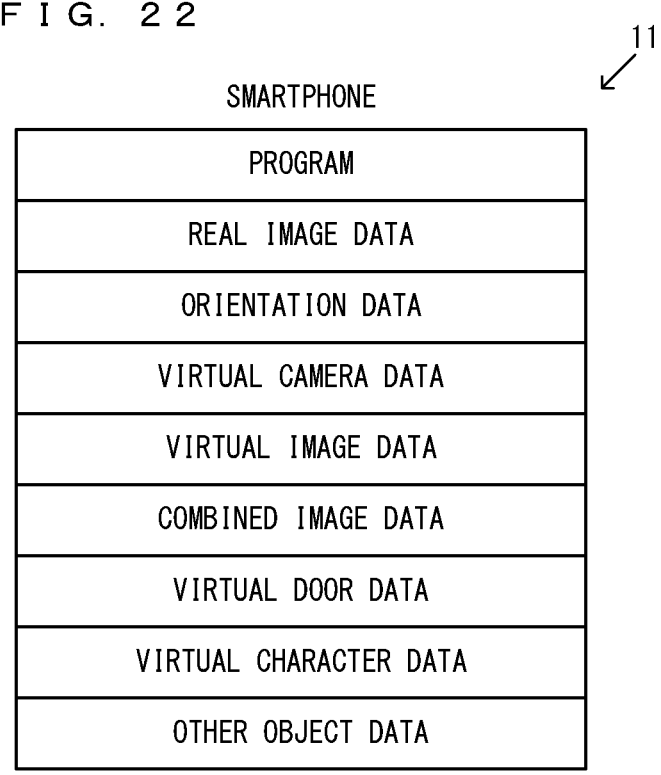
FIG. 22 is an example non-limiting diagram showing an example of data stored in a memory 11 of the smartphone 1.

Next, a description is given of data stored in the smartphone 1. FIG. 22 is a diagram showing an example of data stored in the memory 11 of the smartphone 1.

As shown in FIG. 22, the smartphone 1 stores a program for performing information processing shown in flow charts described below. The smartphone 1 stores real image data, orientation data, virtual camera data, virtual image data, combined image data, virtual door data, virtual character data, and other object data.

The real image data is data indicating a real image captured by the camera 13. The processor 10 acquires a real image from the camera 13 at predetermined time intervals (e.g., 1/60-second intervals) and stores real image data indicating the real image in the memory 11.

The orientation data is data indicating the orientation of the smartphone 1 in the real space and is data indicating the orientation of the camera 13. The orientation data is calculated based on an output (e.g., an acceleration value and/or an angular velocity value) from the orientation detection sensor 14. For example, the orientation data may include data regarding the rotation in the up-down direction (the angle θ) and data regarding the rotation in the left-right direction (the angle φ) of the image capturing direction of the camera 13.

The virtual camera data is data regarding the virtual camera VC and includes data indicating the orientation (the image capturing direction) of the virtual camera VC and data indicating the position of the virtual camera VC in virtual space.

The virtual image data is data indicating a virtual image captured by the virtual camera VC. The virtual image is repeatedly generated at predetermined time intervals (e.g., 1/60-second intervals).

The combined image data is data indicating a combined image obtained by combining a real image and a virtual image. The combined image is generated by superimposing the virtual image on the real image. The combined image is repeatedly generated at predetermined time intervals (e.g., 1/60-second intervals).

The virtual door data is data regarding the virtual door VD. The virtual door data includes data indicating the orientation of the virtual door VD and data indicating the position of the virtual door VD.

The virtual character data is data regarding the virtual characters C1 and C2 placed in the second virtual space VS2. The virtual character data includes data indicating the position and the orientation of each virtual character. The other object data is data regarding other virtual objects (e.g., the virtual table VT) placed in the second virtual space VS2 and includes data indicating the positions and the orientation of the objects.

(Details of Processing Performed by Smartphone)

Figure 23:
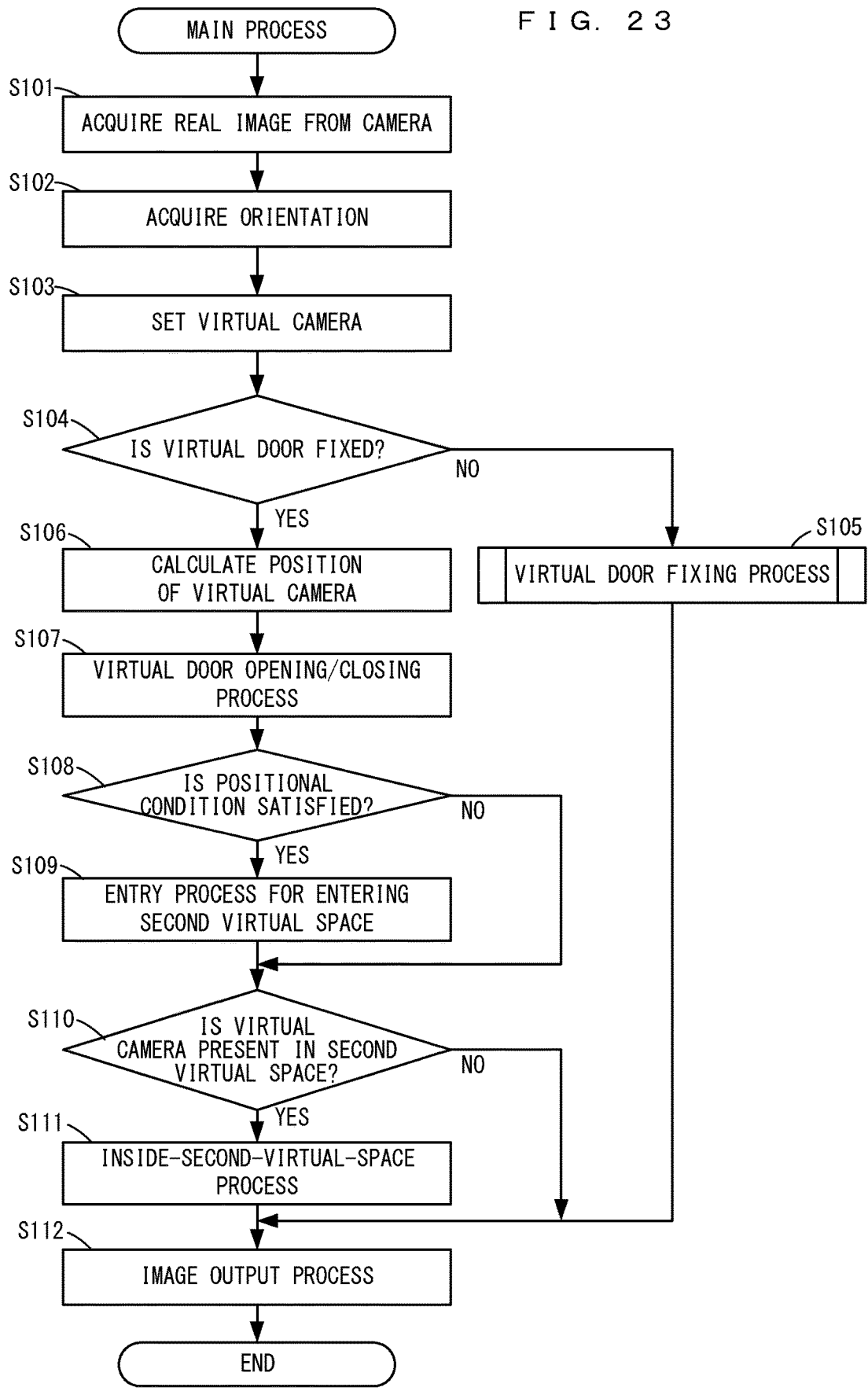
FIG. 23 is an example non-limiting flow chart showing an example of a main process executed by a processor 10 of the smartphone 1.

Next, a description is given of the details of processing performed by the smartphone 1. FIG. 23 is a flow chart showing an example of a main process executed by the processor 10 of the smartphone 1. The main process shown in FIG. 23 is repeatedly executed at predetermined time intervals (e.g., 1/60-second intervals).

As shown in FIG. 23, the processor 10 acquires a real image from the camera 13 (step S101). The acquired real image is stored as real image data in the memory 11.

Next, the processor 10 acquires the orientation of the camera 13 (the smartphone 1) (step S102). For example, based on an acceleration value and/or an angular velocity value detected by the orientation detection sensor 14, the processor 10 calculates the orientation of the camera 13 (the smartphone 1) and stores the calculated orientation as orientation data in the memory 11.

Subsequently, the processor 10 sets the virtual camera VC in the virtual space (step S103). Specifically, the processor 10 sets the orientation of the camera 13 acquired in step S102 as the orientation of the virtual camera VC. The orientation of the virtual camera VC only needs to follow the orientation of the camera 13, and may be set to come close to the orientation of the camera 13 over a predetermined time.

Next, the processor 10 determines whether or not the virtual door VD is fixed (step S104). In step S104, it is determined whether or not the virtual door VD is fixed in the virtual space (i.e., whether or not the virtual door VD is fixed in a simulated manner in the real space). If the process of step S205 described below has already been performed, the determination is YES in step S104.

If the virtual door VD is not fixed (step S104: NO), the processor 10 performs a virtual door fixing process (step S105). The process of step S105 is a process before the virtual door VD is fixed in the virtual space, and includes a process for fixing the virtual door VD. A description is given below of the details of the virtual door fixing process.

(Virtual Door Fixing Process)

FIG. 24 is a flow chart showing the details of the virtual door fixing process in step S105. As shown in FIG. 24, the processor 10 determines whether or not θ is greater than the first threshold "a" or θ is smaller than the second threshold "−b" (step S201). The process of step S201 is the process of determining whether or not the image capturing direction of the camera 13 is directed more upward than the first threshold a or the image capturing direction of the camera 13 is directed more downward than the second threshold b.

If the determination is NO in step S201, the processor 10 places the virtual door VD to follow the camera 13 (step S202). For example, the processor 10 places the virtual door VD at the position the certain distance D away from the position of the virtual camera VC in the image capturing direction. Consequently, if the camera 13 is directed in the up direction, the virtual door VD moves in the up direction. If the camera 13 is directed in the down direction, the virtual door VD moves in the down direction. If the camera 13 is directed in the left-right direction, the virtual door VD moves in the left-right direction. The processor 10 also places the virtual door VD so that the yd-axis, which is directed upward, of the virtual door VD is directed in a direction opposite to the direction of gravity. In step S202, the virtual door VD may be placed so that the virtual door VD moves to the position the certain distance D away from the position of the virtual camera VC in the image capturing direction over a predetermined time.

If, on the other hand, the determination is YES in step S201, the processor 10 places the virtual door VD by restricting the position in the up-down direction of the virtual door VD (step S203). For example, if θ>a, i.e., if the image capturing direction of the camera 13 is directed more upward than the first threshold a, based on the position of the virtual camera VC, the processor 10 calculates as the position of the virtual door VD the position the certain distance D away in the image capturing direction when it is assumed that θ=a. If θ<−b, i.e., if the image capturing direction of the camera 13 is directed more downward than the second threshold b, based on the position of the virtual camera VC, the processor 10 calculates as the position of the virtual door VD the position the certain distance D away in the image capturing direction when it is assumed that θ=−b. In step S203, the virtual door VD may be placed so that the virtual door VD moves to the thus calculated position over a predetermined time.

If the process of step S202 or S203 is executed, the processor 10 determines whether or not a predetermined user operation for fixing the virtual door VD is performed (step S204).

If the predetermined user operation is performed (step S204: YES), the processor 10 fixes the virtual door VD in a simulated manner in the real space (step S205). The real space and the virtual space are associated with each other, and the virtual door VD is fixed in the virtual space, whereby the virtual door VD is fixed in a simulated manner in the real space. For example, if the vx-vy-vz coordinate system fixed in the virtual space is set in accordance with the real space, the position of the virtual door VD is represented as a coordinate value in the vx-vy-vz coordinate system. The coordinate value of the virtual door VD at the time when the predetermined user operation is performed is stored, and the coordinate value is not updated after that, whereby the virtual door VD is fixed in the virtual space. The position of the virtual door VD at the time when the predetermined user operation is performed may be set as the origin of the vx-vy-vz coordinate system. At this time, the coordinate value of the virtual camera VC in the vx-vy-vz coordinate system is determined. After that, if the camera 13 moves, the coordinate value of the virtual camera VC in the vx-vy-vz coordinate system is also changed in accordance with the movement of the camera 13, but the origin of the vx-vy-vz coordinate system (i.e., the position of the virtual door VD) does not change.

In step S205, the second virtual space VS2 is set with respect to the position of the virtual door VD. Specifically, the virtual floor VF is set so that the positions in the height direction of the bottom surface of the virtual door VD and the virtual floor VF of the second virtual space VS2 match each other. The virtual floor VF is set to be perpendicular to the virtual door VD (so that the virtual floor VF is perpendicular to the direction of gravity). In the second virtual space VS2, the virtual characters C1 and C2 and the virtual table VT are placed. Even if the second virtual space VS2 is set in step S205, the second virtual space VS2 is set to be transparent. Thus, the user cannot view the second virtual space VS2.

Next, the processor 10 changes the display form of the virtual door VD from the first display form to the second display form (step S206). For example, the virtual door VD may be changed from the form of a dashed line to the form of a solid line. In step S206, the color of the virtual door VD may be changed, or the virtual door VD may be changed from a semi-transparent form to an opaque form.

If the determination is NO in step S204, or if the process of step S206 is performed, the processor 10 ends the process shown in FIG. 24 and returns the processing to FIG. 23.

Referring back to FIG. 23, if the virtual door VD is fixed (step S104: YES), the processor 10 calculates the position of the virtual camera VC (step S106). Specifically, based on the real image from the camera 13, the processor 10 calculates the position of the virtual camera VC in the virtual space. Based on the real image acquired from the camera 13, the processor 10 calculates the moving direction and the amount of movement of the camera 13 (the smartphone 1), and in accordance with the calculated moving direction and amount of movement, calculates the position of the virtual camera VC, and stores the calculated position as virtual camera data.

Next, the processor 10 performs a virtual door opening/closing process (step S107). Specifically, based on an input from the input device 12, the processor 10 determines whether or not an operation for opening or closing the virtual door VD is performed by the user. For example, the processor 10 determines whether or not the virtual door VD is touched. For example, when the virtual door VD is in the closed state, and if the operation for opening or closing the virtual door VD is performed, the processor 10 changes the virtual door VD to the open state. In a case where the virtual door VD is in the open state, and if the operation for opening or closing the virtual door VD is performed, the processor 10 changes the virtual door VD to the closed state. If the virtual door VD changes to the open state, the second virtual space VS2 relating to an open portion of the virtual door VD becomes opaque, whereby the second virtual space VS2 can be viewed through the open portion.

Next, the processor 10 determines whether or not the positional condition for the virtual camera VC and the virtual door VD is satisfied. Specifically, if the distance between the virtual camera VC and the virtual door VD in the virtual space is less than a predetermined value, and the position in the left-right direction of the virtual camera VC is within the range of the width of the virtual door VD, and the position in the up-down direction of the virtual camera VC is within the range of the height of the virtual door VD, the processor 10 determines that the positional condition is satisfied.

If the positional condition is satisfied (step S108: YES), the processor 10 performs an entry process for entering the second virtual space (step S109). Specifically, the processor 10 sets a flag indicating that the virtual camera VC is present in the second virtual space VS2 to ON. The virtual camera VC is placed in the second virtual space VS2. Various virtual objects (the virtual floor VF, the virtual walls VW, the virtual ceiling, the virtual characters C1 and C2, the virtual table VT, and the like) in the second virtual space VS2 are set to be opaque. Consequently, on the display device 15 of the smartphone 1, a virtual image obtained by viewing the inside of the second virtual space VS2 from the virtual camera VC is displayed. The virtual door VD is a virtual object connecting the second virtual space VS2 and the virtual space VS outside the second virtual space VS2 and can also be seen from the inside of the second virtual space VS2. After the virtual camera VC enters the second virtual space VS2, the virtual camera VC stays in the second virtual space VS2 until the virtual camera VC comes out of the second virtual space VS2 through the virtual door VD. If the entry process for entering the second virtual space is performed, a virtual boundary is set between the inside and the outside of the second virtual space VS2. The second virtual space VS2 is associated with a predetermined range in the real space. However, after the virtual camera VC enters the second virtual space VS2, even if the camera 13 comes out of the predetermined range in the real space from a position other than the virtual door VD, the virtual camera VC does not come out of the second virtual space VS2, and stays at the virtual boundary. At this time, a virtual image obtained by capturing the virtual boundary (e.g., an image that is entirely black) is displayed on the display device 15. Before the virtual camera VC enters the second virtual space VS2, even if the camera 13 enters the predetermined range in the real space from a position other than the virtual door VD, a combined image obtained by combining the real image from the camera 13 and a virtual image from the virtual camera VC is continuously displayed. That is, after it is determined that the virtual camera VC enters the second virtual space VS2, a process different from that before it is determined that the virtual camera VC enters the second virtual space VS2 is performed.

If the process of step S109 is performed, or if the determination is NO in step S108, the processor 10 determines whether or not the virtual camera VC is present in the second virtual space (step S110).

If the virtual camera VC is present in the second virtual space (step S110: YES), the processor 10 performs an inside-second-virtual-space process (step S111). The process of step S111 is a process when the virtual camera VC is present in the second virtual space VS2, and is the process of controlling the virtual camera VC in the second virtual space VS2 based on the position of the virtual camera VC calculated in step S106. For example, if the virtual camera VC comes close to the virtual door VD in the second virtual space VS2 (i.e., the virtual camera VC and the virtual door VD satisfy the above predetermined positional condition), an expulsion process for bringing the virtual camera VC out of the second virtual space VS2 is performed. In the expulsion process, the flag indicating that the virtual camera VC is present in the second virtual space VS2 is set to OFF. If the expulsion process is performed, the virtual camera VC comes out of the second virtual space VS2. If the virtual camera VC comes out of the second virtual space VS2, the state returns to that before the virtual camera VC enters the second virtual space VC2. Consequently, on the display device 15 of the smartphone 1, a combined image obtained by combining the real image from the camera 13 and the virtual image obtained by viewing the virtual space VS from the virtual camera VC is displayed. If, on the other hand, the virtual camera VC moves to the boundary of the second virtual space VS2 at a position other than the virtual door VD (if the camera 13 moves to a boundary in the above predetermined range in the real space), the movement of the virtual camera VC is restricted. Specifically, even if the camera 13 moves beyond the predetermined range in the real space, the virtual camera VC does not come out of the second virtual space VS2, and stays at the virtual boundary set between the inside and the outside of the second virtual space VS2.

If the process of step S111 is performed, or if the determination is NO in step S110, or if the process of step S105 is performed, the processor 10 performs an image output process (step S112). Specifically, if the virtual camera VC is present outside the second virtual space VS2 (i.e., the virtual space VS), the processor 10 superimposes a virtual image captured by the virtual camera VC on the real image captured by the camera 13, thereby generating a combined image. Then, the processor 10 outputs the generated combined image to the display device 15. If the virtual camera VC is present in the second virtual space VS2, the processor 10 generates a virtual image obtained by viewing the second virtual space VS2 from the virtual camera VC and outputs the virtual image to the display device 15.

After the virtual door VD is fixed in the above step S205, and if a predetermined release operation is performed by the user, the fixing of the virtual door VD may be released. In this case, the virtual door VD becomes able to move in the virtual space again. Then, the processor 10 ends the process shown in FIG. 23.

The processes shown in the above flow charts are merely illustrative, and the order and the contents of the processes, the values used in the determinations, and the like may be appropriately changed.

As described above, in the exemplary embodiment, in accordance with the state where the camera 13 moves or the image capturing direction of the camera 13 changes, the virtual camera VC moves in the virtual space, or the image capturing direction of the virtual camera VC changes. In accordance with the movement or the change in the image capturing direction of the virtual camera VC, the virtual door VD moves in the virtual space, and in accordance with a predetermined user operation, the virtual door VD is fixed.

Specifically, before the virtual door VD is fixed, if the image capturing direction of the camera 13 is within a predetermined range in the up-down direction (if $-b < \theta < a$), the virtual door VD moves in the up-down direction in linkage to the image capturing direction of the camera 13 (the virtual camera VC). If the camera 13 translates in the up, down, front, back, left, and right directions, the virtual door VD also translates in the same direction in the virtual space. Then, in accordance with a predetermined user operation, the virtual door VD is fixed in the virtual space. On the other hand, if the image capturing direction of the camera 13 is directed more upward than the first threshold a or directed more downward than the second threshold b, the virtual door VD does not move in the up-down direction in linkage to the image capturing direction of the camera 13.

Consequently, it is possible to move the virtual door VD and fix the virtual door VD in a simulated manner at a desired position in the real space, and it is also possible to prevent the virtual door VD from being fixed at too high a position or too low a position. The user can enter the second virtual space VS2 through the virtual door VD, and it is possible to make it easy to enter the second virtual space VS2.

The bottom surface of the virtual door VD matches the virtual floor VF of the second virtual space VS2, and the second virtual space VS2 is formed continuously with the virtual door VD. That is, the virtual door VD is located at the boundary between the virtual space VS and the second virtual space VS2, and the height in the real space of the virtual door VD and the height in the real space of the second virtual space VS2 match each other. Consequently, it is possible to form the virtual door VD as an entrance to the second virtual space VS2. After fixing the virtual door VD in a simulated manner in the real space, the user can enter the second virtual space VS2 from the virtual door VD without feeling discomfort.

If the virtual camera VC is brought close to the virtual door VD by moving the camera 13, and the virtual camera VC reaches the position of the virtual door VD, the virtual camera VC enters the second virtual space VS2. Consequently, it is possible to enter the second virtual space VS2 through the virtual door VD, and it is possible to give the user a feeling as if entering the second virtual space VS2 through the virtual door VD in the real space.

The virtual door VD as a three-dimensional virtual object is placed in the virtual space, and the virtual door VD moves in the virtual space in the state where the orientation of the virtual door VD is maintained to be perpendicular to the horizontal plane in the virtual space. That is, the virtual door VD moves in the virtual space while maintaining the state of standing upright. Consequently, if the virtual door VD is fixed, it is possible to make the virtual floor VF horizontal without making the second virtual space VS2 oblique.

In the exemplary embodiment, the virtual door VD is placed at a predetermined position in the image capturing direction of the virtual camera VC. Consequently, for example, it is possible to place the virtual door VD in the virtual space without even detecting a predetermined plane in the real space (a horizontal plane such as a floor surface or a table surface, or a surface of a marker). Even if the camera 13 moves, or the image capturing direction changes, it is possible to control the position of the virtual door VD in linkage to the camera 13, and it is possible to display a virtual image obtained by the virtual camera VC capturing the virtual door VD.

(Variations)

While the exemplary embodiment has been described above, the exemplary embodiment is merely an example and may be modified as follows, for example.

For example, in the above exemplary embodiment, if $-b < \theta < a$, i.e., if the angle $\theta$ of the image capturing direction of the camera 13 to the horizontal plane is greater than $-b$ and smaller than a, the image capturing direction of the virtual camera VC and the virtual object direction that is the direction from the virtual camera VC to the virtual door VD are linked together so that the image capturing direction of the virtual camera VC and the virtual object direction match each other. Specifically, in accordance with the image capturing direction of the camera 13, the image capturing direction of the virtual camera VC is set, and the virtual door VD is moved in the up-down direction. In another exemplary embodiment, if $-b < \theta < a$, the image capturing direction of the virtual camera VC and the position in the up-down direction of the virtual door VD may be set in accordance with the image capturing direction of the camera 13 so that the image capturing direction of the virtual camera VC and the above virtual object direction are linked together at a first linkage level. Here, the state where the two directions "are linked together at the first linkage level" includes a case where the two directions always completely match each other. In this case, if the image capturing direction of the virtual camera VC changes, the above virtual object direction changes by the same amount as the amount of change in the image capturing direction of the virtual camera VC. The state where the two directions "are linked together at the first linkage level" includes a case where the two directions do not always completely match each other, but the two directions match each other over a predetermined time. The state where the two directions "are linked together at the first linkage level" may also include a case where the two directions do not completely match each other. The state where the two directions "are linked together at the first linkage level" also includes a case where the image capturing direction of the virtual camera VC and the above virtual object direction do not change at all.

In the above exemplary embodiment, if $\theta < -b$, or if $\theta > a$, the virtual door VD is not moved in accordance with the change in the image capturing direction of the camera 13. In another exemplary embodiment, if $\theta < -b$, or if $\theta > a$, the image capturing direction of the virtual camera VC and the position in the up-down direction of the virtual door VD may be set in accordance with the image capturing direction of the camera 13 so that the image capturing direction of the virtual camera VC and the virtual object direction that is the direction from the virtual camera VC to the virtual door VD are linked together at a second linkage level lower than the first linkage level. For example, even if $\theta < -b$, or even if $\theta > a$, the virtual door VD may be moved. Here, the state where "the image capturing direction of the virtual camera VC and the virtual object direction are linked together at the second linkage level lower than the first linkage level" includes a case where, if the image capturing direction of the camera 13 changes compared to a case where $-b < \theta < a$, it looks as if the virtual door VD viewed from the display device 15 did not move at all in the real space, a case where the range of the movement of the virtual door VD becomes small, a case where the moving velocity of the virtual door VD becomes small, and the like. Here, the state where "the image capturing direction of the virtual camera VC and the virtual object direction that is the direction from the virtual camera VC to the virtual door VD are linked together at the second linkage level lower than the first linkage level" includes a case where, if the image capturing direction of the virtual camera VC changes, the above virtual object direction does not change at all, i.e., even if the image capturing direction of the virtual camera VC changes, the position of the virtual door VD does not change. The state where "the image capturing direction of the virtual camera VC and the above virtual object direction are linked together at the second linkage level lower than the first linkage level" includes a case where, if the image capturing direction of the virtual camera VC changes, the degree of change in the above virtual object direction is smaller (the amount of movement of the virtual door VD is smaller) than in a case where $-b < \theta < a$. For example, if $\theta > a$, and if the camera 13 changes by 10 degrees in the up direction, the image capturing direction of the virtual camera VC may also change by 10 degrees in the up direction, but the above virtual object direction may only change by an angle (e.g., 5 degrees)

smaller than 10 degrees (in this case, the virtual door VD moves at a distance equivalent to "5 degrees" in the up direction).

In the above exemplary embodiment, on the premise that the image capturing direction of the camera 13 and the image capturing direction of the virtual camera VC match each other, in accordance with the angle θ indicating the image capturing direction of the camera 13 (the virtual camera VC), the position of the virtual door VD is controlled in the virtual space. In another exemplary embodiment, if the angle θ indicating the image capturing direction of the camera 13 satisfies −b<θ<a, in accordance with the image capturing direction of the camera 13, the image capturing direction of the virtual camera VC and the position of the virtual door VD may not be changed. If θ<−b or θ>a, in accordance with the image capturing direction of the camera 13, only either one of the image capturing direction of the virtual camera VC and the position of the virtual door VD may be changed. By such control, if the camera 13 is not directed too upward or too downward (if −b<θ<a), the image capturing direction of the virtual camera VC and the virtual object direction that is the direction from the virtual camera VC to the virtual door VD match each other, and it looks as if the virtual door VD moved in the up-down direction by following the change in the image capturing direction of the camera 13 in the up-down direction. On the other hand, if the camera 13 is directed too upward or too downward (if θ<−b or θ>a), the image capturing direction of the virtual camera VC and the virtual object direction do not match each other, and it looks as if the virtual door VD did not move in the up-down direction by following the change in the image capturing direction of the camera 13 in the up-down direction.

In the above exemplary embodiment, the orientation of the virtual camera VC is set so that the orientation of the camera 13 and the orientation of the virtual camera VC match each other. If −b<θ<a, in accordance with the image capturing direction of the camera 13, the image capturing direction of the virtual camera VC is set, and the virtual door VD is also moved, whereby the image capturing direction of the virtual camera VC and the virtual object direction that is the direction from the virtual camera VC to the virtual door VD are linked together. In another exemplary embodiment, in a case where −b<θ<a, and if the image capturing direction of the camera 13 changes, the virtual door VD may not be moved, the image capturing direction of the virtual camera VC may be changed, and the position of the virtual camera VC may also be changed. In this case, the relative positional relationship between the virtual camera VC and the virtual door VD does not change, and the image capturing direction of the virtual camera VC and the virtual object direction do not change. Thus, if the image capturing direction of the camera 13 changes, it looks as if the virtual door VD moved by following the motion of the camera 13. In a case where −b<θ<a, and if the image capturing direction of the camera 13 changes, both the image capturing direction of the virtual camera VC and the position of the virtual door VD may be changed. That is, in a case where −b<θ<a, and if the image capturing direction of the camera 13 changes, at least either one of the image capturing direction of the virtual camera VC and the position of the virtual door VD may be controlled so that the image capturing direction of the virtual camera VC and the virtual object direction that is the direction from the virtual camera VC to the virtual door VD are linked together.

In the above exemplary embodiment, if the virtual door VD is not fixed in a simulated manner, in accordance with the movement of the camera 13 in the real space, the virtual camera VC is moved in the virtual space, and the virtual door VD is moved in the virtual space. Consequently, if the virtual door VD is not fixed in a simulated manner, the virtual camera VC and the virtual door VD maintain certain distance D from each other. In another exemplary embodiment, in a case where the virtual door VD is not fixed in a simulated manner, and even if the camera 13 moves, the virtual camera VC and the virtual door VD may not be moved in the virtual space, and the distance between the virtual camera VC and the virtual door VD may be maintained to be constant.

In the above exemplary embodiment, on the premise that the virtual camera VC is moved in the virtual space in accordance with the movement of the camera 13 in the real space, the virtual door VD is fixed in the virtual space, thereby fixing the virtual door VD in a simulated manner in the real space. In another exemplary embodiment, if the camera 13 moves, the virtual door VD may be moved while the virtual camera VC remains fixed in the virtual space, thereby fixing the virtual door VD in a simulated manner in the real space. For example, if the camera 13 moves in the left direction, the virtual door VD is moved by the same amount of movement in the right direction in the virtual space, whereby the virtual camera VC relatively moves in the left direction with respect to the virtual door VD. At this time, the virtual door VD in the combined image displayed on the display device 15 moves in the right direction in the screen. As described above, in a case where the camera 13 moves, and even if the virtual door VD is moved in the virtual space, it is possible to allow the user to recognize that the virtual door VD is fixed at a predetermined position in the real space. If the camera 13 moves, both the virtual camera VC and the virtual door VD may be moved. If the image capturing direction of the camera 13 changes, the virtual door VD may be moved, whereby it may look as if the virtual door VD was fixed in the real space. For example, if the camera 13 is directed in the right direction from the front, the virtual door VD may be moved in the left direction so that the virtual door VD moves in the left direction as viewed from the virtual camera VC in the virtual space. If the camera 13 is directed in the right direction from the front, the virtual camera VC may be directed in the right direction while the virtual door VD remains fixed so that the virtual door VD moves in the left direction as viewed from the virtual camera VC in the virtual space. In this case, in accordance with the change in the image capturing direction of the camera 13 in the right direction, the virtual door VD displayed on the display device 15 moves in the left direction. Thus, it looks as if the virtual door VD was fixed in the real space. That is, at least any one of the position of the virtual camera, the image capturing direction of the virtual camera, and the position of the virtual door VD may be controlled in accordance with the position or the image capturing direction of the camera 13 so that the virtual door VD viewed in the combined image displayed on the display device 15 is fixed in a simulated manner in the real space.

Even after the virtual door VD is fixed in a simulated manner in the real space, the virtual door VD may somewhat move in the virtual space. For example, even after the virtual door VD is fixed in a simulated manner in the real space, to correct the shake of the camera 13, the virtual door VD may be slightly moved in the virtual space in accordance with the slight movement of the camera 13.

In the above exemplary embodiment, the above restriction (the restriction of the movement of the virtual door VD in the up-down direction) is performed in both a case where the image capturing direction of the camera 13 is directed more upward than the first threshold, and a case where the image capturing direction of the camera 13 is directed more downward than the second threshold. In another exemplary embodiment, the above restriction may be performed in at least either one of a case where the image capturing direction of the camera 13 is directed more upward than the first threshold, and a case where the image capturing direction of the camera 13 is directed more downward than the second threshold.

In another exemplary embodiment, not only the virtual door VD but also any virtual object may be placed in the virtual space, and a process similar to that on the virtual door VD described above may be performed on the virtual object.

That is, an information processing system generates a combined image obtained by combining a real image obtained by a camera sequentially capturing a real space and a virtual image obtained by a virtual camera placed in a virtual space sequentially capturing a virtual object and outputs the combined image to a display device. In a first control state, at least either one of the image capturing direction of the virtual camera and the position of the virtual object may be controlled in accordance with the image capturing direction of the camera so that the image capturing direction of the virtual camera and a virtual object direction that is the direction from the virtual camera to the virtual object are linked together at a first linkage level. The first control state may be changed to a second control state based on a user operation, and in the second control state, at least any one of the position of the virtual camera, the image capturing direction of the virtual camera, and the position of the virtual object may be controlled in accordance with the position or the image capturing direction of the camera so that the virtual object viewed in the combined image is fixed in a simulated manner in the real space. Then, if the image capturing direction of the camera is directed more upward than a first threshold or directed more downward than a second threshold, at least either one of the virtual camera and the virtual object may be controlled so that the image capturing direction of the virtual camera and the above virtual object direction are linked together at a second linkage level lower than the first linkage level.

In the above exemplary embodiment, in a case where the virtual door VD is fixed, and if the virtual camera VC moves to the position of the virtual door VD, the entry process is performed. In another exemplary embodiment, if a predetermined positional condition regarding the position of the virtual camera VC and the position of the virtual object is satisfied, the above entry process may be performed.

In the above exemplary embodiment, the entry process includes the process of determining whether or not the virtual camera VC enters the second virtual space VS2 through the virtual door VD, and the process of setting the flag indicating that the virtual camera VC is present in the second virtual space VS2 to ON. In another exemplary embodiment, if the predetermined positional condition regarding the position of the virtual camera VC and the position of a virtual object is satisfied, not only the above entry process but also an event process regarding the virtual object may be performed. "The event process regarding the virtual object" may include the process of setting the above flag to ON, the process of causing the virtual camera VC to enter the second virtual space VS2 and display the inside of the second virtual space VS2, the process of setting a virtual boundary between the inside and the outside of the second virtual space VS2, the process of generating the second virtual space VS2 with respect to the virtual object, the process of restricting the virtual camera VC from coming out of the second virtual space VS2 from a position other than the virtual object, and the like. "The event process regarding the virtual object" may be the process of changing the display form of the virtual object, the process in which the virtual object and another object have a predetermined positional relationship (e.g., the process in which another object comes into contact with the virtual object), or the like.

In the above exemplary embodiment, the second virtual space VS2 is a small room that can be entered through the virtual door VD, and virtual characters are present in the second virtual space. In another exemplary embodiment, the second virtual space VS2 may be any space, and for example, may be a virtual space representing a particular place on earth, outer space, or the like.

In the above exemplary embodiment, the orientation of the camera 13 (the smartphone 1) is detected using the acceleration sensor and/or the angular velocity sensor, and the position of the camera 13 is detected based on a real image from the camera 13. Then, in accordance with the detected position and orientation of the camera 13, the position and the orientation of the virtual camera VC are set. In another exemplary embodiment, the position and the orientation of the camera 13 (the smartphone 1) may be detected by another method. For example, the position of the camera 13 may be detected using the GPS (Global Positioning System), and the orientation (the image capturing direction) of the camera 13 may be detected using a geomagnetic sensor. Based on a real image captured by the camera 13, the position and the orientation of the camera 13 may be detected. For example, a marker may be detected from the real image captured by the camera 13, and based on the detection result of the marker, the position and the orientation of the camera 13 may be detected. The position and the orientation of the smartphone 1 may be detected by not only the camera 13 fixed to the smartphone 1 but also an external camera capturing the smartphone 1.

In the above exemplary embodiment, a combined image obtained by combining a real image obtained by the camera 13 sequentially capturing a real space and a virtual image obtained by the virtual camera VC sequentially capturing a virtual space is displayed on the display device 15. In another exemplary embodiment, the display device may be a video see-through display device. The user views a real space through a transmissive display device and also views a virtual image displayed on the transmissive display device. As described above, using the transmissive display device, the user may be allowed to view a combined image obtained by combining the real space and the virtual image.

In the above exemplary embodiment, the smartphone 1 obtained by unifying a camera, a display device, and a processor that performs the above processing is used. The smartphone 1 is merely an example of an information processing system. For example, an information processing system in which a camera, a display device, and a processor are separate from each other may be used. An information processing system may be composed of an apparatus obtained by unifying a camera and a processor, and a display device separate from the apparatus. An information processing system may be composed of an apparatus obtained by unifying a camera and a display device, and an apparatus including a processor separate from the apparatus. An information processing system may be configured by connecting a camera, a display device, and a processor via a network (a LAN, the Internet, or the like).

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system that outputs to a display device a combined image obtained by combining a real image obtained by an image capturing apparatus sequentially capturing a real space and a virtual image obtained by a virtual camera placed in a virtual space sequentially capturing a virtual object, the information processing system, comprising: at least one processor and a memory coupled thereto, the processor being configured to control the information processing system to at least:
   in a first control state, control at least either one of an image capturing direction of the virtual camera and a position of the virtual object in accordance with an image capturing direction of the image capturing apparatus so that the image capturing direction of the virtual camera and a virtual object direction that is a direction from the virtual camera to the virtual object are linked together at a first linkage level;
   based on a user operation, change the first control state to a second control state;
   in the second control state, control at least any one of a position of the virtual camera, the image capturing direction of the virtual camera, and the position of the virtual object in accordance with a position or the image capturing direction of the image capturing apparatus so that the virtual object viewed in the combined image is fixed in a simulated manner at a position in the real space; and
   in the first control state, if the image capturing direction of the image capturing apparatus is directed more upward than a first threshold or directed more downward than a second threshold in the real space, control at least either one of the image capturing direction of the virtual camera and the position of the virtual object so that the image capturing direction of the virtual camera and the virtual object direction are linked together at a second linkage level lower than the first linkage level.

2. The information processing system according to claim 1, wherein
   the at least one processor is configured to, in the second control state, if a positional condition regarding the position of the virtual camera and the position of the virtual object is satisfied, execute an event process regarding the virtual object.

3. The information processing system according to claim 2, wherein
   if the virtual camera comes close to within a distance from the virtual object, the positional condition is satisfied,
   a second virtual space is set with respect to the position of the virtual object,
   the event process is a process of determining that the virtual camera enters the second virtual space, and
   if the virtual camera enters the second virtual space, in accordance with the position or the image capturing direction of the image capturing apparatus, the position or the image capturing direction of the virtual camera in the second virtual space is controlled.

4. The information processing system according to claim 3, wherein
   in the first control state, if the image capturing direction of the image capturing apparatus changes in an up-down direction, the at least one processor moves the virtual object in the up-down direction while maintaining an orientation of the virtual object in a vertical direction in the virtual space.

5. The information processing system according to claim 3, wherein
   if the virtual object is fixed in a simulated manner, the at least one processor changes a state of the virtual object from a first state to a second state based on a user operation, and
   if the virtual object is changed to the second state, the second virtual space becomes able to be viewed from the virtual camera located in the virtual space.

6. The information processing system according to claim 1, wherein
   even if the image capturing direction of the image capturing apparatus is directed more upward than the first threshold or directed more downward than the second threshold, the at least one processor controls at least either one of the image capturing direction of the virtual camera and the position of the virtual object in accordance with a change in the image capturing direction of the image capturing apparatus in a left-right direction so that the image capturing direction of the virtual camera and the virtual object direction are linked together at the first linkage level.

7. The information processing system according to claim 1, wherein
   in the first control state, if the image capturing apparatus moves, the at least one processor controls the position of the virtual camera and the position of the virtual object so that the virtual camera and the virtual object maintain a certain distance from each other.

8. The information processing system according to claim 1, wherein
   in the first control state, the at least one processor sets the image capturing direction of the virtual camera in accordance with the image capturing direction of the image capturing apparatus and controls the position of the virtual object to follow a change in the image capturing direction of the virtual camera.

9. The information processing system according to claim 1, wherein
   if the virtual object is fixed in a simulated manner in the real space, the at least one processor changes a display form of the virtual object.

10. The information processing system according to claim 1, wherein
    the at least one processor places the virtual object at a position in the image capturing direction of the virtual camera without detecting a plane in the real space based on the real image captured by the image capturing apparatus.

11. A non-transitory computer-readable storage medium having stored therein an information processing program executed by a computer of an information processing apparatus that outputs to a display device a combined image obtained by combining a real image obtained by an image capturing apparatus sequentially capturing a real space and a virtual image obtained by a virtual camera placed in a virtual space sequentially capturing a virtual object, the information processing program causing the computer to:

in a first control state, control at least either one of an image capturing direction of the virtual camera and a position of the virtual object in accordance with an image capturing direction of the image capturing apparatus so that the image capturing direction of the virtual camera and a virtual object direction that is a direction from the virtual camera to the virtual object are linked together at a first linkage level;

based on a user operation, change the first control state to a second control state;

in the second control state, control at least any one of a position of the virtual camera, the image capturing direction of the virtual camera, and the position of the virtual object in accordance with a position or the image capturing direction of the image capturing apparatus so that the virtual object viewed in the combined image is fixed in a simulated manner at a position in the real space; and in the first control state, if the image capturing direction of the image capturing apparatus is directed more upward than a first threshold or directed more downward than a second threshold in the real space, control at least either one of the image capturing direction of the virtual camera and the position of the virtual object so that the image capturing direction of the virtual camera and the virtual object direction are linked together at a second linkage level lower than the first linkage level.

12. An information processing apparatus that outputs to a display device a combined image obtained by combining a real image obtained by an image capturing apparatus sequentially capturing a real space and a virtual image obtained by a virtual camera placed in a virtual space sequentially capturing a virtual object, the information processing apparatus, comprising: at least one processor and a memory coupled thereto, the processor being configured to control the information processing apparatus to at least:

in a first control state, control at least either one of an image capturing direction of the virtual camera and a position of the virtual object in accordance with an image capturing direction of the image capturing apparatus so that the image capturing direction of the virtual camera and a virtual object direction that is a direction from the virtual camera to the virtual object are linked together at a first linkage level;

based on a user operation, change the first control state to a second control state;

in the second control state, control at least any one of a position of the virtual camera, the image capturing direction of the virtual camera, and the position of the virtual object in accordance with a position or the image capturing direction of the image capturing apparatus so that the virtual object viewed in the combined image is fixed in a simulated manner at a position in the real space; and in the first control state, if the image capturing direction of the image capturing apparatus is directed more upward than a first threshold or directed more downward than a second threshold in the real space, control at least either one of the image capturing direction of the virtual camera and the position of the virtual object so that the image capturing direction of the virtual camera and the virtual object direction are linked together at a second linkage level lower than the first linkage level.

13. An information processing method executed by an information processing system that outputs to a display device a combined image obtained by combining a real image obtained by an image capturing apparatus sequentially capturing a real space and a virtual image obtained by a virtual camera placed in a virtual space sequentially capturing a virtual object, the information processing method comprising:

in a first control state, controlling at least either one of an image capturing direction of the virtual camera and a position of the virtual object in accordance with an image capturing direction of the image capturing apparatus so that the image capturing direction of the virtual camera and a virtual object direction that is a direction from the virtual camera to the virtual object are linked together at a first linkage level;

based on a user operation, changing the first control state to a second control state;

in the second control state, controlling at least any one of a position of the virtual camera, the image capturing direction of the virtual camera, and the position of the virtual object in accordance with a position or the image capturing direction of the image capturing apparatus so that the virtual object viewed in the combined image is fixed in a simulated manner at a position in the real space; and in the first control state, if the image capturing direction of the image capturing apparatus is directed more upward than a first threshold or directed more downward than a second threshold in the real space, controlling at least either one of the image capturing direction of the virtual camera and the position of the virtual object so that the image capturing direction of the virtual camera and the virtual object direction are linked together at a second linkage level lower than the first linkage level.

14. An information processing system that outputs to a display device a combined image obtained by combining a real image obtained by an image capturing apparatus sequentially capturing a real space and a virtual image obtained by a virtual camera placed in a virtual space sequentially capturing a virtual object, the information processing system, comprising: at least one processor and a memory coupled thereto, the processor being configured to control the information processing system to at least:

control an image capturing direction of the virtual camera in accordance with an image capturing direction of the image capturing apparatus;

control a position of the virtual object in a form of following the image capturing direction of the virtual camera;

based on a user operation, control the position of the virtual object so that the position of the virtual object is fixed in a simulated manner at a position in the real space;

in a state where the position of the virtual object is fixed, control a position of the virtual camera in accordance with a position of the image capturing apparatus; and if the image capturing direction of the image capturing apparatus is directed more upward than a first threshold or directed more downward than a second threshold in the real space, control the position of the virtual object so that a degree to which the virtual object follows the image capturing direction of the virtual camera decreases.

15. A non-transitory computer-readable storage medium having stored therein an information processing program executed by a computer of an information processing apparatus that outputs to a display device a combined image obtained by combining a real image obtained by an image capturing apparatus sequentially capturing a real space and a virtual image obtained by a virtual camera placed in a virtual space sequentially capturing a virtual object, the information processing program causing the computer to:

> control an image capturing direction of the virtual camera in accordance with an image capturing direction of the image capturing apparatus;
>
> control a position of the virtual object in a form of following the image capturing direction of the virtual camera;
>
> based on a user operation, control the position of the virtual object so that the position of the virtual object is fixed in a simulated manner at a position in the real space;
>
> in a state where the position of the virtual object is fixed, control a position of the virtual camera in accordance with a position of the image capturing apparatus; and
>
> if the image capturing direction of the image capturing apparatus is directed more upward than a first threshold or directed more downward than a second threshold in the real space, control the position of the virtual object so that a degree to which the virtual object follows the image capturing direction of the virtual camera decreases.

16. An information processing apparatus that outputs to a display device a combined image obtained by combining a real image obtained by an image capturing apparatus sequentially capturing a real space and a virtual image obtained by a virtual camera placed in a virtual space sequentially capturing a virtual object, the information processing apparatus, comprising: at least one processor and a memory coupled thereto, the processor being configured to control the information processing system to at least:

> control an image capturing direction of the virtual camera in accordance with an image capturing direction of the image capturing apparatus;
>
> control a position of the virtual object in a form of following the image capturing direction of the virtual camera;
>
> based on a user operation, control the position of the virtual object so that the position of the virtual object is fixed in a simulated manner at a position in the real space;
>
> in a state where the position of the virtual object is fixed, control a position of the virtual camera in accordance with a position of the image capturing apparatus; and
>
> if the image capturing direction of the image capturing apparatus is directed more upward than a first threshold or directed more downward than a second threshold in the real space, control the position of the virtual object so that a degree to which the virtual object follows the image capturing direction of the virtual camera decreases.

17. An information processing method executed by an information processing system that outputs to a display device a combined image obtained by combining a real image obtained by an image capturing apparatus sequentially capturing a real space and a virtual image obtained by a virtual camera placed in a virtual space sequentially capturing a virtual object, the information processing method comprising:

> controlling an image capturing direction of the virtual camera in accordance with an image capturing direction of the image capturing apparatus;
>
> controlling a position of the virtual object in a form of following the image capturing direction of the virtual camera;
>
> based on a user operation, controlling the position of the virtual object so that the position of the virtual object is fixed in a simulated manner at a position in the real space;
>
> in a state where the position of the virtual object is fixed, controlling a position of the virtual camera in accordance with a position of the image capturing apparatus; and
>
> if the image capturing direction of the image capturing apparatus is directed more upward than a first threshold or directed more downward than a second threshold in the real space, controlling the position of the virtual object so that a degree to which the virtual object follows the image capturing direction of the virtual camera decreases.

* * * * *